(12) United States Patent
Narayanan et al.

(10) Patent No.: US 9,252,559 B2
(45) Date of Patent: Feb. 2, 2016

(54) NARROW BANDWIDTH REFLECTORS FOR REDUCING STIMULATED BRILLOUIN SCATTERING IN OPTICAL CAVITIES

(75) Inventors: Chellappan Narayanan, Morristown, NJ (US); Glen A. Sanders, Morristown, NJ (US); Lee K. Strandjord, Morristown, NJ (US); Jianfeng Wu, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 277 days.

(21) Appl. No.: 13/545,497

(22) Filed: Jul. 10, 2012

(65) Prior Publication Data

US 2014/0204387 A1    Jul. 24, 2014

(51) Int. Cl.
*H01S 3/10* (2006.01)
*G01C 19/72* (2006.01)

(52) U.S. Cl.
CPC .......... *H01S 3/10023* (2013.01); *G01C 19/721* (2013.01); *G01C 19/727* (2013.01)

(58) Field of Classification Search
CPC .... G01C 19/727; G01C 19/66; G01C 19/721; H01S 5/1071; H01S 3/083; H01S 3/30; H01S 5/06258; H01S 5/065; G02B 6/29359; G02B 2006/12107; G02F 2203/15; G02F 1/035
USPC ............ 356/461, 477, 480; 372/6, 32, 21, 64, 372/96; 385/12; 359/334
See application file for complete search history.

(56) References Cited

U.S. PATENT DOCUMENTS

| | | | |
|---|---|---|---|
| 5,327,446 A | 7/1994 | Waynant | |
| 5,528,367 A | 6/1996 | Putnam | |
| 6,813,447 B2 * | 11/2004 | Ellis et al. | 398/155 |
| 6,901,101 B2 | 5/2005 | Frick | |
| 7,227,644 B2 | 6/2007 | Anson et al. | |
| 7,283,216 B1 | 10/2007 | Geng et al. | |
| 7,292,761 B2 | 11/2007 | Miyake | |
| 7,539,231 B1 * | 5/2009 | Honea et al. | 372/69 |

(Continued)

FOREIGN PATENT DOCUMENTS

| | | |
|---|---|---|
| WO | 9610282 | 4/1996 |
| WO | 2004111695 | 12/2004 |

OTHER PUBLICATIONS https://www.rp-photonics.com/brillouin_scattering.htm.*

(Continued)

*Primary Examiner* — Tarifur Chowdhury
*Assistant Examiner* — Mohamed Amara
(74) *Attorney, Agent, or Firm* — Fogg & Powers LLC

(57) ABSTRACT

An optical-fiber filter system to narrow a linewidth and to reduce noise fluctuations of an optical beam is provided. The optical-fiber filter system includes an optical fiber having a first end-face and an opposing second end-face, the first end-face and the second end-face setting a fiber length; a fiber Bragg grating having a first reflectivity positioned at the first end-face; and a reflector having a second reflectivity positioned at the second end-face. When the optical beam at a first frequency is coupled from a laser into one of the first end-face or the second end-face, a resonant cavity is established at the first frequency between the fiber Bragg grating and the reflector while Brillouin scattered light shifted from the first frequency within the optical fiber is transmitted through the fiber Bragg grating.

19 Claims, 12 Drawing Sheets

(56) References Cited

U.S. PATENT DOCUMENTS

| | | | |
|---|---|---|---|
| 8,511,401 B2* | 8/2013 | Zediker | E21B 7/14 166/65.1 |
| 2002/0015154 A1* | 2/2002 | Goldner et al. | 356/465 |
| 2003/0068150 A1 | 4/2003 | Ariel | |
| 2004/0086004 A1* | 5/2004 | Bonaccini et al. | 372/6 |
| 2004/0233458 A1 | 11/2004 | Frick | |
| 2005/0105867 A1 | 5/2005 | Koch | |
| 2005/0220458 A1* | 10/2005 | Kupershmidt et al. | 398/196 |
| 2006/0109877 A1* | 5/2006 | Caton et al. | 372/33 |
| 2007/0280304 A1 | 12/2007 | Deile | |
| 2008/0219300 A1* | 9/2008 | Krupkin et al. | 372/6 |
| 2009/0316134 A1* | 12/2009 | Michael et al. | 356/4.01 |
| 2010/0044106 A1 | 2/2010 | Zediker et al. | |
| 2010/0290057 A1 | 11/2010 | Qiu et al. | |
| 2011/0019198 A1* | 1/2011 | Sanders et al. | 356/461 |
| 2011/0134940 A1 | 6/2011 | Hartog | |
| 2012/0307251 A1 | 12/2012 | Sanders et al. | |
| 2012/0307253 A1* | 12/2012 | Sanders et al. | 356/461 |

OTHER PUBLICATIONS

M. D. Mermelstein et al., "11.2 dB SBS gain suppression in a large mode area Yb-doped optical fiber", Proc. SPIE 6873, U63 (2008).*

Y. Koyamada et al., "Simulating and designing Brillouin gain spectrum in single mode fibers", J. Lightwave Technol. 22, 631 (2004).*

J. Hansryd et al., "Increase of the SBS threshold in a short highly nonlinear fiber by applying a temperature distribution", J. Lightwave Technol. 19, 1691 (2001).*

Y. Imai and N. Shimada, "Dependence of stimulated Brillouin scattering on temperature distribution in polarization-maintaining fibers", IEEE Photon. Technol. Lett. 5, 1335 (1993).*

Sanders et al., "High Performance Hollow-Core Optical-Fiber Filter for Optical Rotation Sensing", U.S. Appl. No. 13/150,976, filed Jun. 1, 2011, pp. 1-38.

* cited by examiner

NARROW BANDWIDTH REFLECTORS FOR REDUCING STIMULATED BRILLOUIN SCATTERING IN OPTICAL CAVITIES

GOVERNMENT LICENSE RIGHTS

This invention was made with Government support under HR0011-08-C-0019 awarded by DARPA. The Government has certain rights in the invention.

BACKGROUND

Resonator fiber optic gyroscope (RFOG) has the potential of serving a wide range of applications. Narrow linewidth lasers with very low phase noise are a critical component needed for achieving the high performance targets for the RFOG. Currently available lasers and potential lasers in development do not meet the phase noise requirements.

SUMMARY

The present application relates to an optical-fiber filter system to narrow a linewidth and to reduce noise fluctuations of an optical beam. The optical-fiber filter system includes an optical fiber having a first end-face and an opposing second end-face, the first end-face and the second end-face setting a fiber length; a fiber Bragg grating having a first reflectivity positioned at the first end-face; and a reflector having a second reflectivity positioned at the second end-face. When the optical beam at a first frequency is coupled from a laser into one of the first end-face or the second end-face, a resonant cavity is established at the first frequency between the fiber Bragg grating and the reflector while Brillouin scattered light shifted from the first frequency within the optical fiber is transmitted through the fiber Bragg grating, thereby decreasing the interaction length between the incident and Brillouin scattered beam and increasing the threshold for the onset of Stimulated Brillouin Scattering (SBS)

DRAWINGS

In accordance with common practice, the various described features are not drawn to scale but are drawn to emphasize features relevant to the present invention Like reference characters denote like elements throughout figures and text.

DETAILED DESCRIPTION

Figure 1:
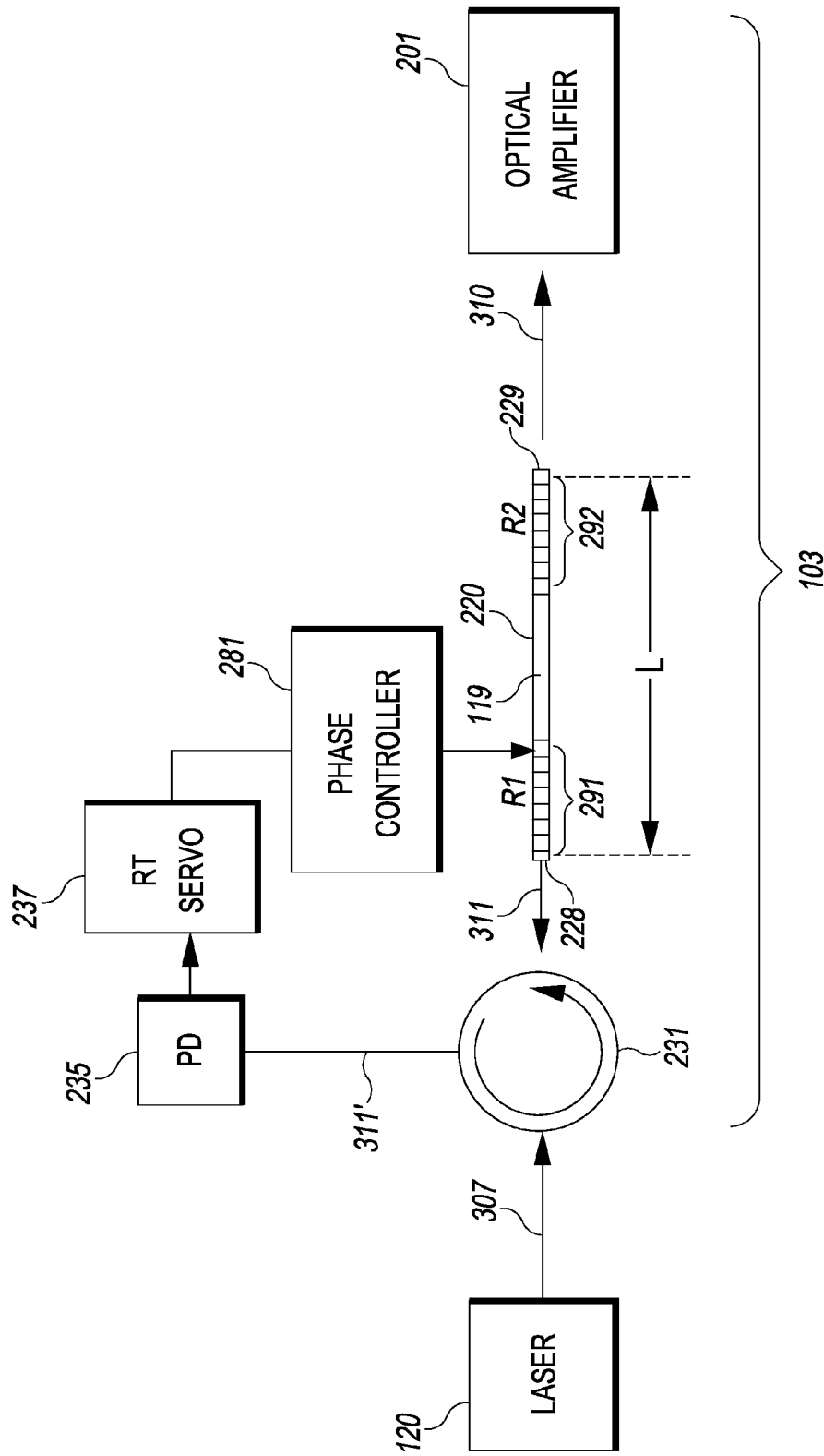
FIG. 1 is a block diagram of an embodiment of an optical-fiber filter system in accordance with the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

To reduce the laser phase noise, an external narrow linewidth optical filter is locked to the laser center frequency using a Pound Dreyer Hall (PDH) loop. This passive filtering approach enables the phase noise reduction at frequencies above the bandwidth of the PDH loop. When narrow linewidth filtering is implemented in a solid core optical fiber with broadband optical reflectors at the end faces of the fiber to form a Fabry-Perot optical cavity, performance of the filter is limited by the onset of stimulated Brillouin scattering (SBS). SBS is a nonlinear optical effect which degrades the performance of the filter.

There are two types of Brillouin scattering phenomena in optical fibers. The first is spontaneous scattering and the second is stimulated scattering. Brillouin scattering, as opposed to Stimulated Brillouin Scattering, is a spontaneous light scattering process from acoustic waves in the material. The process is spontaneous because the light scattering is caused by thermal fluctuations in the medium and the incident beam is weak enough not to alter the dielectric property of the medium in its presence. By contrast, Stimulated Brillouin Scattering (SBS), is caused when the electrical field strength of the incident beam is strong so that the Brillouin scattered beam experiences amplification. Above a certain incident threshold power, the incident and the Brillouin scattered beams coherently couple with each other over the length of the fiber when they are phase matched to the acoustic wave generated in the medium. This positive feedback causes the energy from the incident beam to be coupled to the scattered beam. In the case of optical fibers the Brillouin scattered light is frequency shifted by ~11 GHz from the primary incident beam. The threshold for the onset Stimulated Brillouin Scattering (SBS) in optical fibers is directly dependent on the incident optical power, Brillouin gain coefficient and the interaction length between the incident beam and the Brillouin scattered light beam in the optical fiber. In general, high optical powers and long interaction length are required to produce SBS. However, in an optical cavity, the SBS threshold is small even for a short cavity length because of the increased interaction length from multiple roundtrips of the light beam in the cavity. Therefore, the threshold for the SBS for a short length of fiber used in the Fabry-Perot fiber cavity resonator is lower than the threshold for the SBS for a short length of non-resonant fiber. Most likely this is due to increased SBS interaction length from multiple round trips of the light in the solid core of optical fiber. The SBS increases noise and steals optical power from the incident beam and thus reduces optical power throughput through the filter at the primary signal wavelength.

High performance resonator fiber optic gyroscopes (RFOG) require lasers with narrow linewidth (less than or equal to 1 KHz) and very low phase noise. The optical-fiber filter systems described herein include one or more narrow line-width optical-fiber filter in combination with the Pound-Drever-Hall closed loop servo to reduce laser noise. The one or more narrow line-width optical-fiber filters prevent the generation of SBS and output an optical beam with narrow linewidth and very low phase noise required for a high performance RFOG. The narrow linewidth and very low phase noise optical beam is generated from a standard polarized optical beam resonating in an optical-fiber filter that introduces high loss to Brillouin scattering (BS) (i.e., light Stokes shifted and anti-Stokes shifted from the frequency of the optical beam). At least a portion of the optical-fiber filters described herein include a solid core optical fiber and at least one narrow bandwidth fiber Bragg grating (FBG) to create high loss for the BS modes within the cavity the solid core of the optical fiber. The terms "optical fiber" and "fiber" are used interchangeably herein.

SBS is generated by an optical beam propagating within the optical cavity of the optical-fiber filter. The optical cavity is also referred to herein as a "fiber cavity", "filter cavity", "Fabry-Perot cavity", or "cavity". If SBS occurs in the cavity the beam output from the filter is noisy and reduced in power and contains undesired Brillouin frequency shifted signals. Preventing the oscillation of BS inside the filter cavity (or SBS), is accomplished by reducing the interaction length of the BS optical power with the re-circulating incident light (from the laser) in the cavity is reduced, thereby increasing the optical power threshold for the onset of SBS. The optical-fiber filter systems described herein allow for the phase noise reduction and optical throughput requirements to be met while preventing SBS at the desired input power level. SBS is limited to what is generated in a single pass through the filter system and the threshold for the onset of SBS in a single pass filter system is high because of the short filter length In one implementation of this embodiment, a high performance RFOG has an angle random walk (ARW) of less than or equal to 1000 micro-degree/square root hour ($1000\mu°/\sqrt{hr}$). In currently available laser systems, laser phase noise and relative intensity noise (RIN) noise are important in achieving this level of ARW performance. The optical-fiber filter systems described herein block phase fluctuations above 200 kHz, the frequency above which lasers exhibit high frequency noise, while satisfying the following required features: low optical loss in the cavity to achieve the desired linewidth, very low insertion loss reflectors, low insertion loss of the throughput light beam, narrow passband to reduce SBS effects, and easily manufacturable. In order to achieve low optical loss in the cavity, very low insertion loss reflectors are required. An in-line Fiber Bragg Grating (FBG) meets these requirements. FBGs are periodic index perturbations inscribed on the core of the optical fiber by illuminating the side of the optical fiber using an interference pattern of an ultraviolet laser light. The interference pattern is typically created using a phase mask. The periodic structure in the optical fiber generates a wavelength dependent mirror that reflects certain wavelengths and transmits other wavelengths. Advantageously, the FBG filters are easily spliced to other components in the system with negligible additional insertion loss. Thus, the FBG filters reduce cost and complexity.

For the optical-fiber filters described herein, one or two fiber Bragg gratings act as high reflectance, narrow bandwidth reflectors positioned at one or both end-faces of the optical cavity of the optical-fiber filter. The one or two fiber Bragg gratings act as narrow bandwidth reflectors to reflect the wavelength of the incident light while transmitting the BS optical power out of the cavity. Thus, the one or two fiber Bragg gratings introduce high loss for the BS light beam in the fiber cavity and prevent the SBS from being enhanced or excited in the cavity. In one implementation of this embodiment, both ends of the Fabry-Perot cavity include a FBG reflector. In this case, the two FBG reflectors can have the same or different performance characteristics depending on the requirements of the application. In another implementation of this embodiment, one end of the Fabry-Perot cavity includes a FBG reflector and the other end includes a dielectric minor stack on the end face of the fiber that has high reflectance. In this latter case, the reflectance of the dielectric minor stack may be narrow or relatively broadband, depending on the requirements of the application.

The refractive index, physical length, or both the refractive index and the physical length of the fiber can be changed by introducing a thermal or strain change. The optical phase of the fiber can be changed by: 1) using a PZT to stretch at least a portion of the optical fiber thereby generating a stress-induced refractive index change or physical path length change; or 2) using a temperature controller to change the temperature of at least a portion of the optical fiber to introduce a thermal-induced refractive index or physical length change. A change in the refractive index of the optical fiber, the physical length of the optical fiber (or both) changes the optical path length delay in the cavity and thus changes the frequency at which the resonance peaks occur. The FSR also changes but it is a secondary effect.

Advantageously, the narrow bandwidth fiber Bragg gratings described herein prevent the orthogonal polarization state from forming standing waves in the cavity, thereby achieving high polarization extinction ratio even when there is significant amount of orthogonal polarization state in the input light beam to the filter. Because of the birefringence of the optical fiber, which is approximately $3.3 \times 10^{-4}$, the difference between the peak reflection for the orthogonal polarization states is 0.35 nm (44 GHz). In other words, at the operational wavelength or frequency, if the fiber Bragg grating reflects one polarization state, it transmits the orthogonal polarizations state. This property of the narrow bandwidth optical fiber Bragg grating provides high extinction of the orthogonal polarization state.

FIG. 1 is a block diagram of an embodiment of an optical-fiber filter system 103 in accordance with the present invention. The optical-fiber filter system 103 outputs an optical beam 310 with narrow linewidth and very low phase noise that can be used in a high performance RFOG or in any other application requiring a narrow linewidth and low phase noise optical beam. The optical-fiber filter system 103 includes an optical-fiber filter 220, a circulator 231, a photodiode (PD) 235, a resonance tracking (RT) servo 237, a phase controller 281, and an optical amplifier 201. The optical-fiber filter 220 is a solid core optical fiber 119 that includes a first fiber Bragg grating 291 positioned near or at the input end-face 228 of the optical fiber 119 and a second fiber Bragg grating 292 positioned near or at the output end-face 229 of the optical fiber 119. The optical-fiber filter 220 is a narrow bandwidth reflector filter 220. The input end-face 228 is also referred to herein as a "first end-face 228". The output end-face 229 is also referred to herein as a "second end-face 229". The first end-face 228 opposes the second end-face 229.

The first fiber Bragg grating 291 has a first reflectivity $R_1$ and the second fiber Bragg grating 292 positioned at the second end-face 229 has a second reflectivity $R_2$. In one implementation of this embodiment, the first reflectivity $R_1$ equals the second reflectivity $R_2$. The first fiber Bragg grating 291 and the second fiber Bragg grating 292 function as the reflective surfaces of a Fabry-Perot etalon in which a transmission spectrum is generated by interference between the multiple reflections of light between the two reflecting surfaces (i.e., between the first fiber Bragg grating 291 and the second fiber Bragg grating 292). The transmission spectrum of the Fabry-Perot etalon is a function of wavelength of the reflected light. Constructive interference, corresponding to a high-transmission peak of the etalon, occurs when the transmitted beams are in phase.

When the polarized optical beam 307 emitted from the laser 120 is coupled into one of the first end-face 228 or the second end-face 229, the resonant cavity of length L (i.e., the Fabry-Perot etalon of length L) is established between the first fiber Bragg grating 291 and the second fiber Bragg grating 292. The resonant cavity length L is approximately the fiber length set by the first end-face 228 and the opposing second end-face 229. Specifically, when, the optical beam at a first frequency $v_1$ is coupled into one of the first end-face 228 or the second end-face 229 from a laser 120, a resonant cavity is established at the first frequency $v_1$ between the first fiber Bragg grating 291 and the second fiber Bragg grating 292. The Brillouin scattered light shifted from the first frequency $v_1$ is transmitted through the first fiber Bragg grating 291 and the second fiber Bragg grating 292. An anti-Stokes component of the Brillouin scattered light is upshifted from the first frequency $v_1$ and the Stokes component of the Brillouin scattered light is downshifted from the first frequency $v_1$. The anti-Stokes component of the Brillouin scattered light and the Stokes component of the Brillouin scattered light is referred to herein as "Brillouin scattered light shifted from the first frequency $v_1$". For silica fibers, when the wavelength of the input optical beam is about 1.55 microns, the Stokes shift and anti-Stokes shift is about 10 GHz.

In one implementation of this embodiment, the length L is about 10 meters. In another implementation of this embodiment, the length L is about 5 meters. Other lengths are possible. As defined herein, a fiber Bragg grating positioned at an end-face is a fiber Bragg grating that is formed beginning at the end-face of the fiber. Given that the fiber Bragg grating is periodic structure, a fiber Bragg grating formed beginning at the end-face of the fiber may include a region of low index material between the physical end-face of the fiber and the first high index section in the periodic high index structure. In one implementation of this embodiment, the fiber Bragg grating is formed near the end-face of the fiber and includes a larger region of low index material between the physical end-face of the fiber and the first high index section in the periodic high index structure.

A polarized optical beam 307 that is output from a laser 120 is input to the circulator 231. It is to be understood that the laser 120 may output an elliptically polarized beam and a polarizer is inserted between the laser 120 and the circulator 231. The laser 120 can be a semiconductor laser in including, but not limited to, an edge emitting laser or a vertical cavity surface emitting laser (VCSEL). Other types of lasers can be used as the source of the optical beam 307. The polarized optical beam 307 is output from the circulator 231 and coupled to the optical-fiber filter 220. At least a portion of the polarized optical beam 307 that is coupled into the optical-fiber filter 220 propagates back and forth in the optical fiber 119 based on a first reflection R1 from the first fiber Bragg grating 291 and a second reflection R2 from the second fiber Bragg grating 292, which together create a resonant cavity in the optical fiber 119. The resonant cavity has an effective length L that is based on the distance between the first fiber Bragg grating 291 and the second fiber Bragg grating 292. The frequency separation between adjacent transmission peaks of the resonant cavity of the optical-fiber filter 220 is the free spectral range (FSR), which is approximately equal to $c/(2 nL)$, where c is the speed of light and n is the effective index of the optical fiber. In one implementation of this embodiment, the free spectral range (FSR) of the optical-fiber filter 220 is 5 MHz. In one implementation of this embodiment, the linewidth of the optical-fiber filter 220 is on the order of 200 KHz.

Backscattered BS 311 is output from the input end-face 228 of the optical-fiber filter 220, without being reflected back into the optical-fiber filter 220. Backscattered BS 311 propagates toward the circulator 231. A small portion of the polarized optical beam 307 can be reflected from the input end-face 228 back to the circulator 231. The backscattered BS 311 and any portion of the reflected optical beam 307 are directed from the circulator 231 to the photodiode 235. In one implementation of this embodiment, the circulator 231 is replaced by a plurality of optical components arranged to function in the same manner as the circulator 231.

The photodiode (PD) 235, the resonance tracking servo 237, and phase controller 281 form a feedback loop to adjust the effective length L of the optical-fiber filter 220. The phase controller 281 is configured to input a control signal from the resonance tracking servo. If the resonant peak of the optical-fiber filter 220 requires adjustment, the phase controller 281 is configured to modify the phase of the optical beam propagating in the optical fiber based on the control signal. When the phase controller 281 adjusts the phase of the optical beam propagating in the optical fiber 119, the peak transmission wavelength or frequency of the optical-fiber filter 220 changes. The phase controller 281 adjusts an index of refraction, physical path length, or both of the optical fiber 119 in at least a portion of the optical fiber 119, to adjust the resonant cavity. The phase controller 281 is a temperature controller, a lead zirconate titanate (PZT) controller, and/or any other technology currently available or to be developed in the future that is used to change the phase of the optical beam in the fiber. In this manner, the photodiode 235, the resonance tracking servo 237, and phase controller 281 form a feedback loop to provide feedback to adjust the effective optical path length L (e.g., to adjust the index of refraction, physical path length, or both) of the optical-fiber filter 220 so that the optical beam 310 output to the optical amplifier 201 has a narrow linewidth and reduced noise fluctuations.

In one implementation of this embodiment, the phase controller 281 is a PZT controller 281 configured to adjust the strain on the optical fiber 119 in order to stretch the fiber to introduce a stress-induced refractive index change or a physical path length change (or both) and thereby change the peak transmission wavelength or frequency of the optical-fiber filter 220. In another implementation of this embodiment, the phase controller 281 is a temperature controller 281. The temperature controller 281 is configured to adjust the temperature of at least a portion of the optical fiber 119 in order to change the index of refraction of the fiber and to introduce a thermal-induced refractive index change or a physical path length change (or both) and thereby change the peak transmission wavelength or frequency of the of the optical-fiber filter 220. Other techniques to adjust the effective optical path length of the resonant cavity of the optical-fiber filter 220 are possible. As defined herein, "adjusting the resonant cavity" is changing the effective optical path length of the optical fiber, which has a fiber length set by a first end-face and an opposing second end-face, and which forms the resonant cavity established (at a given frequency) between the fiber Bragg grating 291 and the reflector 292.

The optical beam 310 is output from the optical-fiber filter 220 with low loss. However, its loss may be offset by the use of an optical amplifier. In this case, the output from the fiber filter is amplified by the optical amplifier 201. Thus, when the optical beam 307 from the laser 120 is coupled into one of the first end-face 228 or the second end-face 229, an optical output from the opposing end-face (229 or 228, respectively) has a narrow linewidth and low frequency noise fluctuations. The optical-fiber filter 220 in the optical-fiber filter system 103 is bidirectional and satisfies the Helmholtz reciprocity principle. Therefore, the optical-fiber filter system 103 is operable if the optical beam 307 is input into the second end-face 229 and the output beam 310 is output from the first end-face 228.

Figure 2:
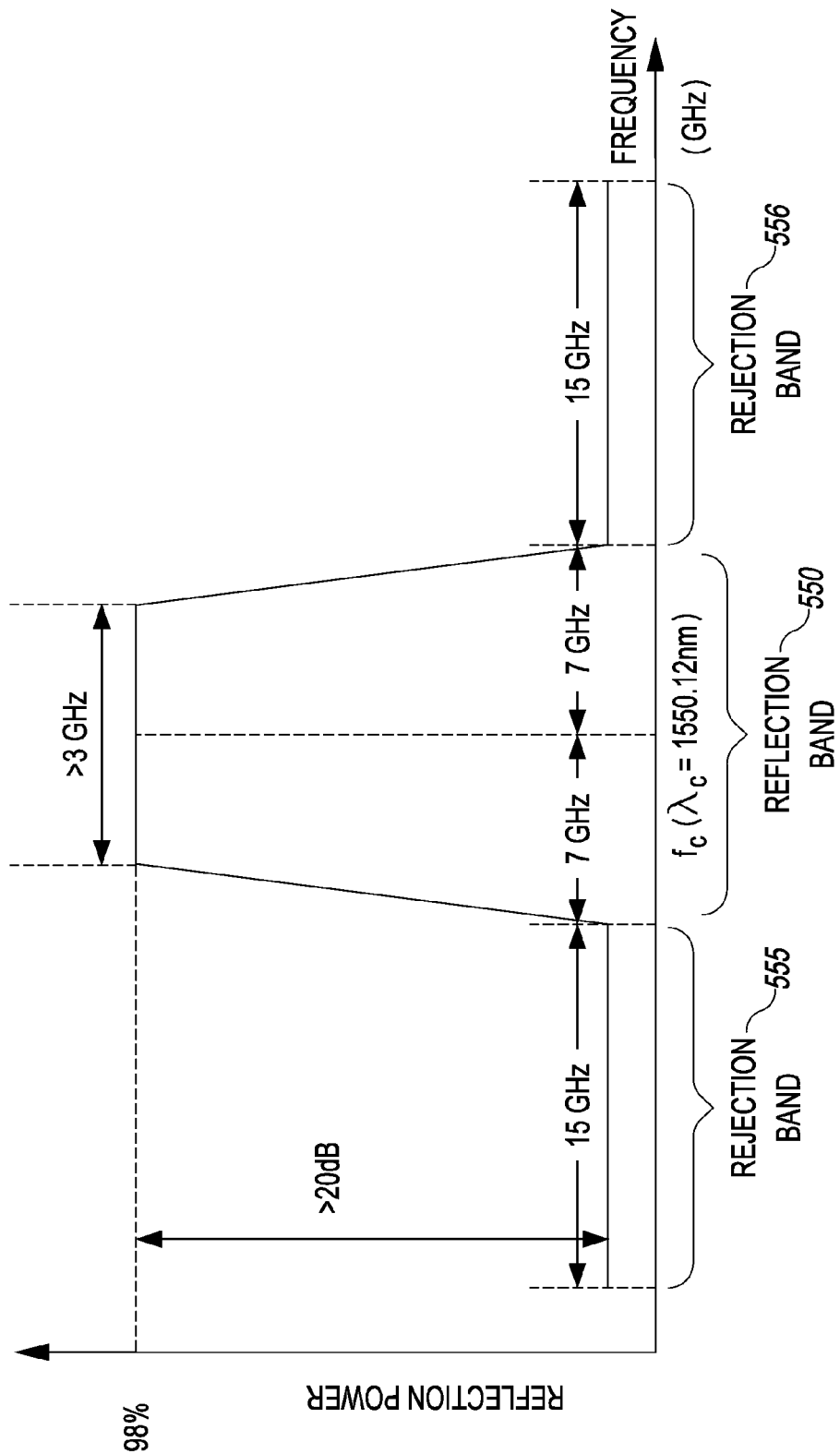
FIG. 2 is plot of the reflective characteristics of an exemplary Fiber Bragg grating in accordance with the present invention.

FIG. 2 is plot of the reflective characteristics of an exemplary fiber Bragg grating 291 and 292 in accordance with the present invention. In this exemplary embodiment, 98% of the optical power centered about a center frequency $f_c$ (in which the center wavelength is $\lambda_c$=1550.12 nm) is reflected by the fiber Bragg grating 291 and 292. Ninety-eight percent of the optical power that is within more than 3 GHz from the center frequency, $f_c$, is reflected. A portion of the optical power that is within 14 GHz range is reflected. The 14 GHz portion of reflected light is referred to as the reflected band 550. The optical power outside of and near the frequency range of the reflected band 550 is transmitted by the fiber Bragg gratings 291 and 292. The fiber Bragg gratings 291 and 292 have a first rejection band 555 that extends from 7 GHz to 22 GHz down from (i.e., at a lower frequency from) the center frequency $f_c$ and a second rejection band 556 that extends from 7 GHz to 22 GHz up from (i.e., at a higher frequency from) the center frequency $f_c$. Thus, a rejection band of 15 GHz is on both sides of the 14 GHz reflection band 555. The amount of optical power that is reflected at frequencies within the rejection bands 555 and 556 is more than 20 dB down from the reflected power within the reflected band 550.

In one implementation of this embodiment, the fiber Bragg gratings 291 and 292 have other center frequencies. In another implementation of this embodiment, the fiber Bragg gratings 291 and 292 have other frequency ranges for the rejection bands 555 and 556 and the reflected band 550. In yet another implementation of this embodiment, rejection ratio between rejection band 555 (rejection band 556) and the reflected band 550 is more than 20 dB. In yet another implementation of this embodiment, rejection ratio between the rejection band 555 (rejection band 556) and the reflected band 550 is more than 15 dB. In yet another implementation of this embodiment, rejection ratio between the rejection band 555 (rejection band 556) and the reflected band 550 is more than 10 dB. In yet another implementation of this embodiment, the reflective characteristics of fiber Bragg gratings 291 and 292 differ from each other. In this latter case, there is some overlap in the reflected band 550 of the first fiber Bragg grating 291 and the reflected band 550 of the second fiber Bragg grating 292 and the overlap is in the region of the frequency of the polarized optical beam 307 that is being multiply-reflected within the optical-fiber filter 220 shown in FIG. 1.

Figure 3:
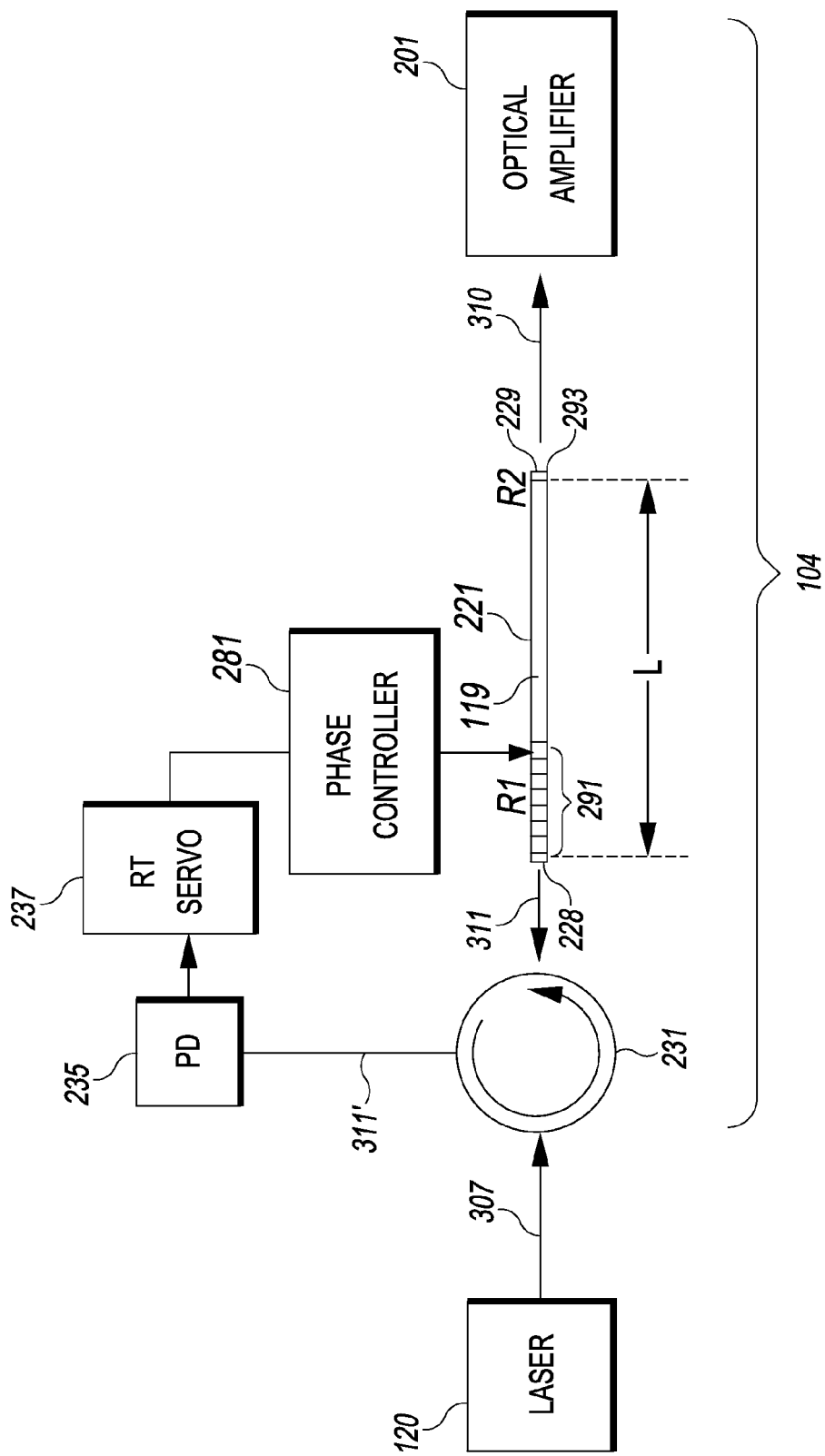
FIGS. 3-5B are block diagrams of embodiments of optical-fiber filter systems in accordance with the present invention.

FIGS. 3-5 are block diagrams of embodiments of optical-fiber filter systems in accordance with the present invention. FIG. 3 is a block diagram of an embodiment of an optical-fiber filter system 104 in accordance with the present invention. The optical-fiber filter system 104 differs from the optical-fiber filter system 103 of FIG. 1 in that the second fiber Bragg grating 292 of FIG. 1 is replaced by a reflector 293 (such as a reflective coating 293 or a broadband reflector 293) on output end-face 229 of the optical fiber 119. The optical-fiber filter system 104 functions in the same manner as the optical-fiber filter system 103 of FIG. 1 in order to output an optical beam 310 with narrow linewidth and very low phase noise. Specifically, when the polarized optical beam 307 at a first frequency $v_1$ is coupled into one of the first end-face 228 or the second end-face 229 from a laser 120, a resonant cavity is established at the first frequency $v_1$ between the fiber Bragg grating 291 and the reflector 293 while Brillouin scattered light shifted from the first frequency is transmitted through the fiber Bragg grating 291. An anti-Stokes component of the Brillouin scattered light is upshifted from the first frequency $v_1$ and the Stokes component of the Brillouin scattered light is downshifted from the first frequency $v_1$.

The optical-fiber filter system 104 includes an optical-fiber filter 221, a circulator 231, a photodiode (PD) 235, a resonance tracking servo 237, a phase controller 281, and an optical amplifier 201. The optical-fiber filter 221 is a narrow bandwidth reflector filter 221. In one implementation of this embodiment, the free spectral range (FSR) of the optical-fiber filter 221 is 5 MHz. The optical-fiber filter 221 is a solid core optical fiber 119 that includes a first fiber Bragg grating 291 positioned near or at the input end-face 228 of the optical fiber 119 and the reflector 293 on the output end-face 229 of the optical fiber 119.

The fiber Bragg grating 291 has a first reflectivity $R_1$ and the reflector 293 positioned at the second end-face has a second reflectivity $R_2$. When the optical beam 307 from the laser 120 is coupled into one of the first end-face 228 or the second end-face 229, a resonant cavity of length L is established between the fiber Bragg grating 291 and the reflector 293 positioned at the second end-face 229. The reflector 293 is relatively broadband and reflects at light at the frequency of the optical beam 307 and at the frequency of the BS generated by the optical beam 307. In this embodiment, any BS that is backscattered by the optical beam 307 to be reflected at the output end-face 229 of the optical fiber 119 is reflected toward the first fiber Bragg grating 291 and is transmitted through the first fiber Bragg grating 291 and the input end-face 228 of the optical fiber 119.

A polarized optical beam 307 that is output from a laser 120 is input to the circulator 231. The polarized optical beam 307 is output from the circulator 231 and coupled to the optical-fiber filter 221. At least a portion of the polarized optical beam 307 that is coupled into the optical-fiber filter 221 propagates back and forth in the optical fiber 119 based on a first reflection R1 from the first fiber Bragg grating 291 and a second reflection $R_2$ from the reflector 293, which together create a resonant cavity in the optical fiber 119. The resonant cavity has an effective length L that is based on the distance between the first fiber Bragg grating 291 and reflective coating 293.

The optical-fiber filter 221 in the optical-fiber filter system 104 is bidirectional and satisfies the Helmholtz reciprocity principle. Therefore, the optical-fiber filter system 104 is also operable if the optical beam 307 is input into the second end-face 229 and the output beam 310 is output from the first end-face 228.

Figure 4A:
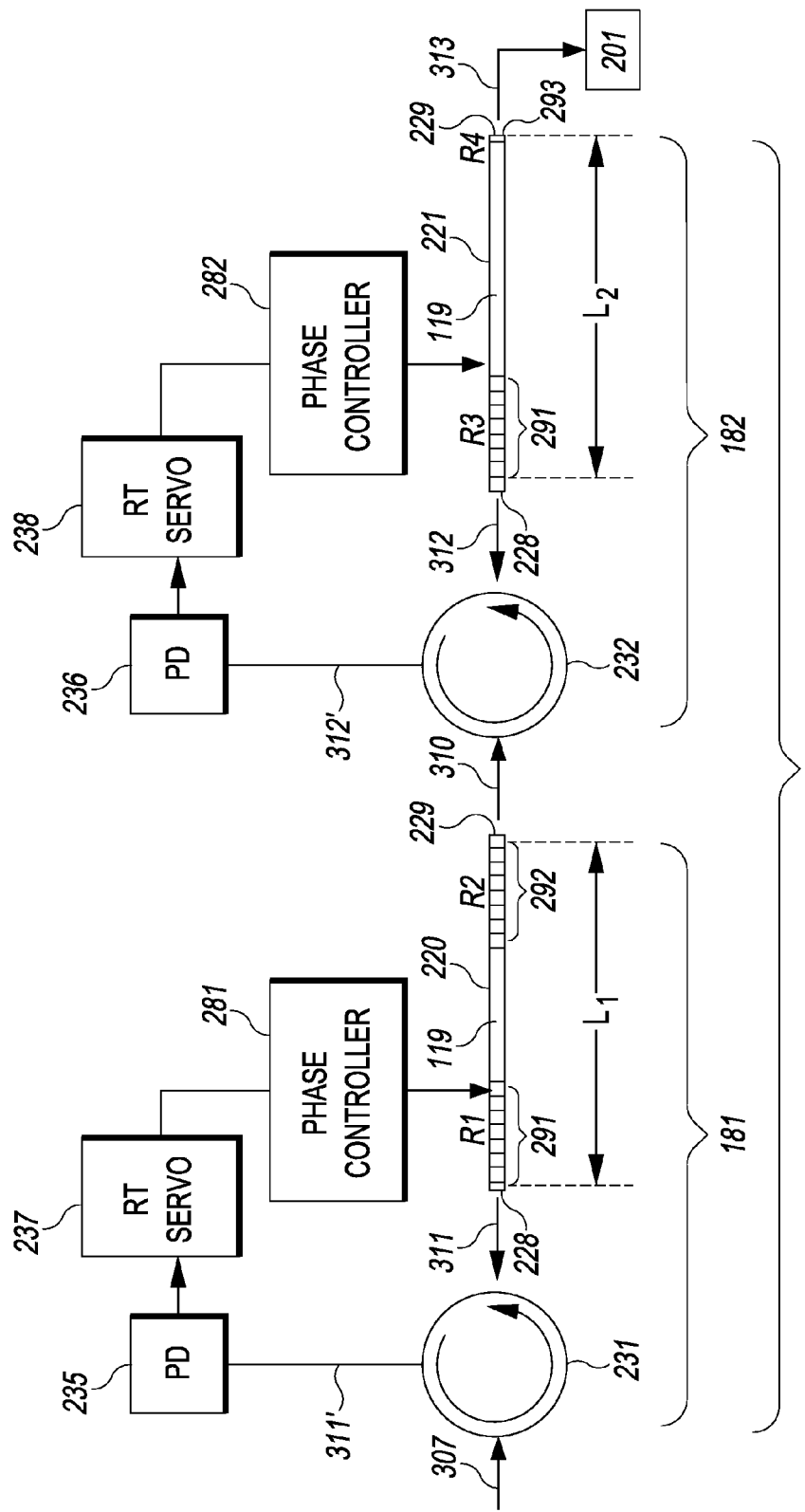

FIG. 4A is a block diagram of an embodiment of an optical-fiber filter system 105 in accordance with the present invention. The optical-fiber filter system 105 includes a first filter portion 181 and a second filter portion 182. The first filter portion 181 and the second filter portion 182 include a first optical-fiber filter 220 and a second optical-fiber filter 221, respectively, that have respective feedback loops to control the optical phase of the associated optical-fiber filters 220 and 221. The first filter portion 181 includes the first optical-fiber filter 220, a first circulator 231, a first photodiode (PD) 235, a first resonance tracking servo 237, and a first phase controller 281. The second filter portion 182 includes the second optical-fiber filter 221, a second circulator 232, a second photodiode (PD) 236, a second resonance tracking (RT) servo 238, and a second phase controller 282. The second filter portion 182 in combination with the first filter portion 181 further reduces the noise on the optical beam output from the optical-fiber filter system 105. The optical-fiber filter system 105 also includes and an optical amplifier 201 at the output of the second optical-fiber filter 221.

As shown in FIG. 4A, the first optical-fiber filter 220 of optical-fiber filter system 105 is similar in structure and function to the first optical-fiber filter 220 of FIG. 1 and the second optical-fiber filter 221 is similar in structure and function to the optical-fiber filter 221 of FIG. 3.

A polarized optical beam 307 output from a laser 120 is input to the first circulator 231. The polarized optical beam 307 is output from the first circulator 231 and coupled to the first optical-fiber filter 220. Backscattered BS 311 is output from the input face 228 of the first optical-fiber filter 220, without being reflected back into the first optical-fiber filter 220 by the input end-face 228. Backscattered BS 311 propagates toward the first circulator 231. A small portion of the polarized optical beam 307 can be reflected back to the first circulator 231. The backscattered BS 311 and any portion of the reflected optical beam 307 are directed from the first circulator 231 to the first photodiode 235.

The first photodiode (PD) 235, the first resonance tracking servo 237, and the first phase controller 281 form a feedback loop to adjust the effective first resonant cavity length $L_1$ of the first optical-fiber filter 220. The first resonant cavity length $L_1$ is approximately the fiber length set by the first end-face 228 and the opposing second end-face 229. If the resonant peak of the first optical-fiber filter 220 requires adjustment, the first phase controller 281 is configured to adjust the phase of the light propagating in the first optical fiber 119. In one implementation of this embodiment, the first phase controller 281 is a first PZT controller 281 configured to adjust the strain on the first optical fiber 119 to change the optical path (and thereby the phase) of the first optical-fiber filter 220. In another implementation of this embodiment, the first phase controller 281 is a first temperature controller 281 configured to adjust the temperature of the first optical fiber 119 to change the index of refraction, the physical path length, or both (and thereby change the phase) of the first optical-fiber filter 220. Other techniques to adjust the effective length $L_1$ of the cavity of the first optical-fiber filter 220 are possible.

The optical beam 310 output from the first filter portion 181 is input to the second circulator 232. The optical beam 310 is output from the second circulator 232 and coupled to the second optical-fiber filter 221. In this manner, the second optical-fiber filter 221 inputs the polarized optical beam 310 output from the first optical-fiber filter 220 via the second circulator 232. Backscattered BS 312 is output from the input face 228 of the second optical-fiber filter 220, without being reflected back into the second optical-fiber filter 220 by the input end-face 228. Backscattered BS 312 propagates toward the second circulator 232. A small portion of the polarized optical beam 310 can be reflected back to the second circulator 232. The backscattered BS 312 and any portion of the reflected optical beam 310 are directed from the second circulator 232 to the second photodiode 236.

The second photodiode (PD) 236, the second resonance tracking servo 238, and the second phase controller 282 form a feedback loop to adjust the effective second resonant cavity length $L_2$ of the second optical-fiber filter 221. The second resonant cavity length $L_2$ is approximately the fiber length set by the first end-face 228 and the opposing second end-face 229. If the resonant peak of the second optical-fiber filter 221 requires adjustment, the second phase controller 282 is configured to adjust the phase of the light propagating in the second optical-fiber filter 221.

In one implementation of this embodiment, the second phase controller 282 is a second PZT controller 282 configured to adjust the strain on the second optical-fiber filter 221 to change the optical path (and thereby the phase) of the second optical-fiber filter 221. In another implementation of this embodiment, the second phase controller 282 is a second temperature controller 282 configured to adjust the temperature of the second optical-fiber filter 221 to change the index of refraction, the physical path length, or both (and thereby change the phase) of the second optical-fiber filter 221. Other techniques to adjust the effective length $L_2$ of the cavity of the second optical-fiber filter 221 are possible.

The optical beam 313 that is transmitted through the first filter portion 181 and the second filter portion 182 is amplified by the optical amplifier 201. In one implementation of this embodiment, there are three or more filter portions that transmit the optical beam from the laser 120 to the optical amplifier 201.

Figure 4B:
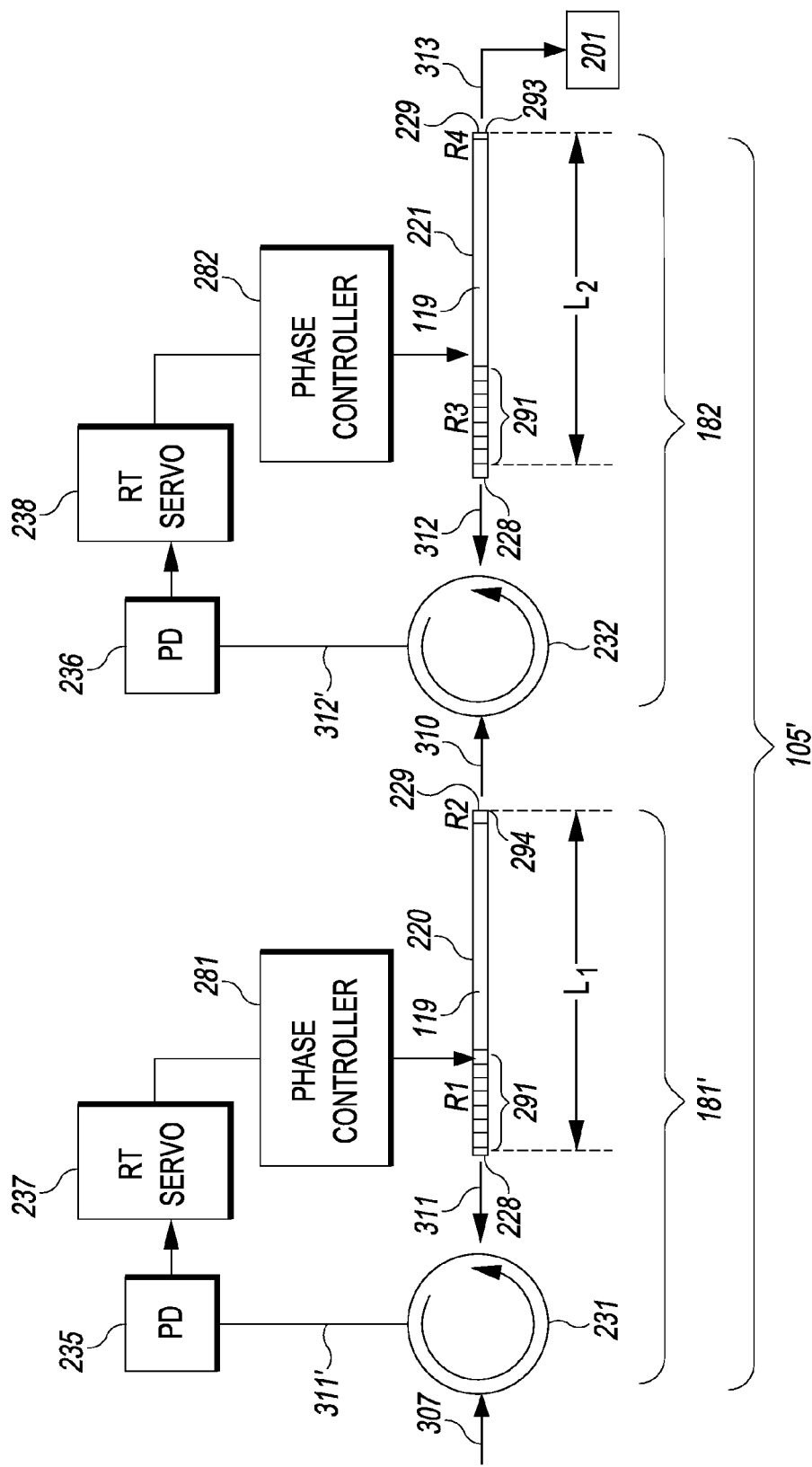

FIG. 4B is a block diagram of an embodiment of an optical-fiber filter system 105' in accordance with the present invention. The optical-fiber filter system 105' includes a first filter portion 181' and a second filter portion 182. FIG. 4B is similar in function to the optical-fiber filter system 105 of FIG. 4A. FIG. 4B differs in structure from the optical-fiber filter system 105 of FIG. 4A in that the first filter portion 181' includes an optical-fiber filter 221 as shown in FIG. 3.

Figure 4C:
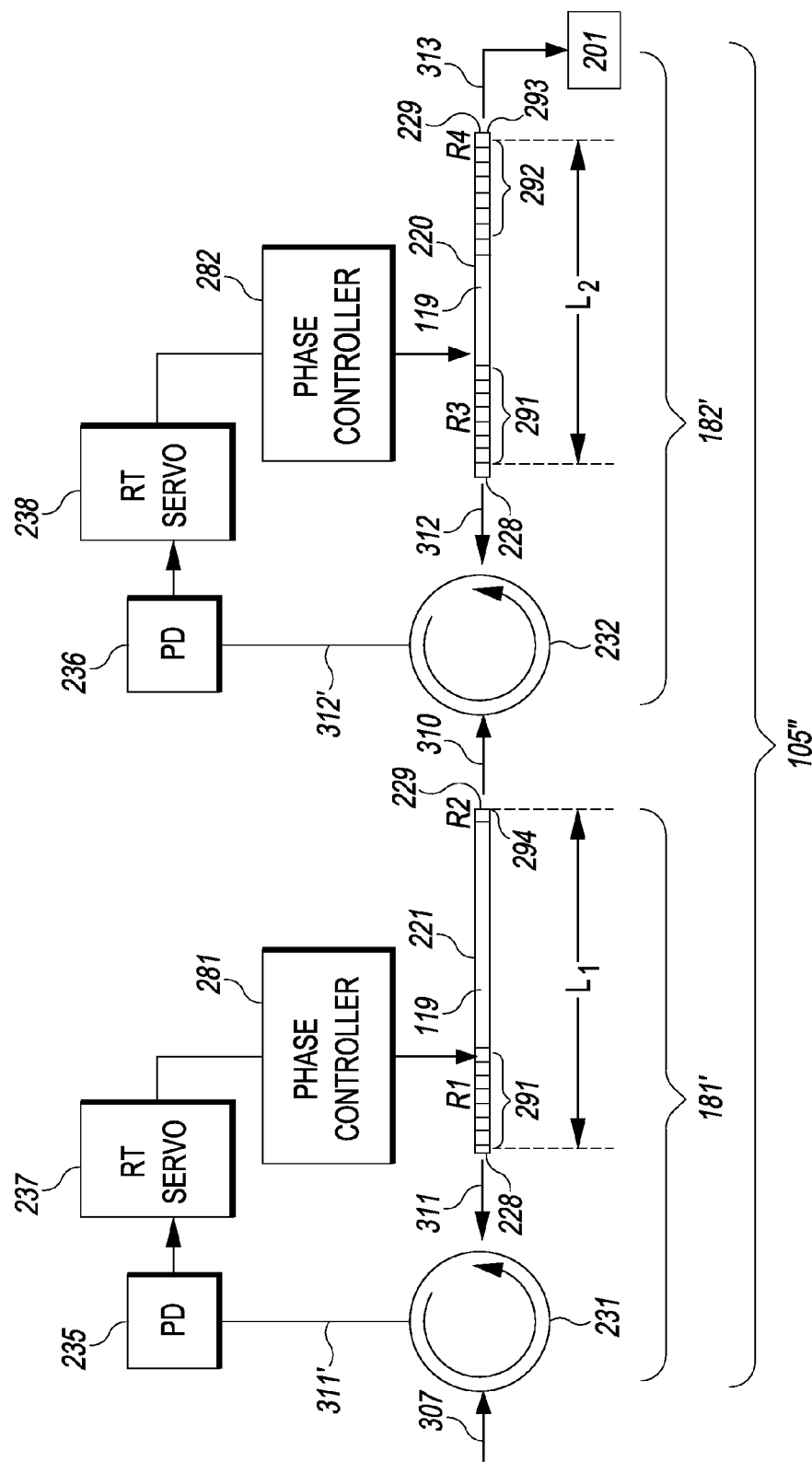

FIG. 4C is a block diagram of an embodiment of an optical-fiber filter system 105" in accordance with the present invention. The optical-fiber filter system 105" includes a first filter portion 181' and a second filter portion 182'. FIG. 4C is similar in function to the optical-fiber filter system 105 of FIG. 4A. FIG. 4C differs in structure from the optical-fiber filter system 105 of FIG. 4A in that the first filter portion 181' includes an optical-fiber filter 221 as shown in FIG. 3 and second filter portion 182' includes an optical-fiber filter 220 as shown in FIG. 1.

Figure 4D:
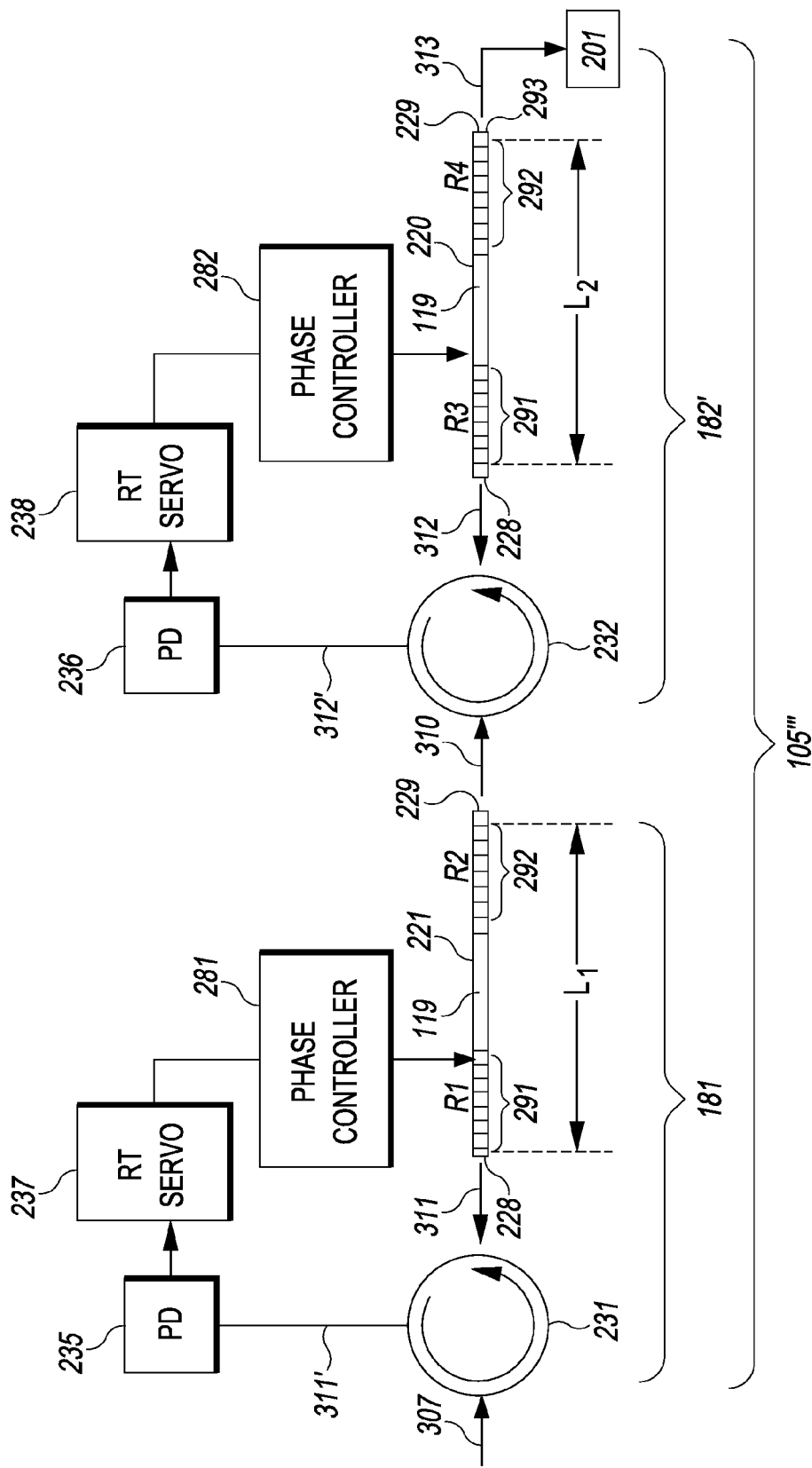

FIG. 4D is a block diagram of an embodiment of an optical-fiber filter system 105'" in accordance with the present invention. The optical-fiber filter system 105'" includes a first filter portion 181 and a second filter portion 182'. FIG. 4D is similar in function to the optical-fiber filter system 105 of FIG. 4A. FIG. 4D differs in structure from the optical-fiber filter system 105 of FIG. 4A in that the second filter portion 182' includes an optical-fiber filter 220 as shown in FIG. 1. The optical-fiber filter systems 105, 105', 105", and 105'" of respective FIGS. 4A-4D function to further reduce the laser linewidth of the laser 120 and to further reduce the frequency noise fluctuations on the optical beam 313 output from the second optical-fiber filter 220 or 221. Specifically, the second filter portions further reduce the linewidth of the laser 120 narrowed by the first filter portion and further reduce the laser frequency noise fluctuations reduced by the first filter portion.

Figure 5A:
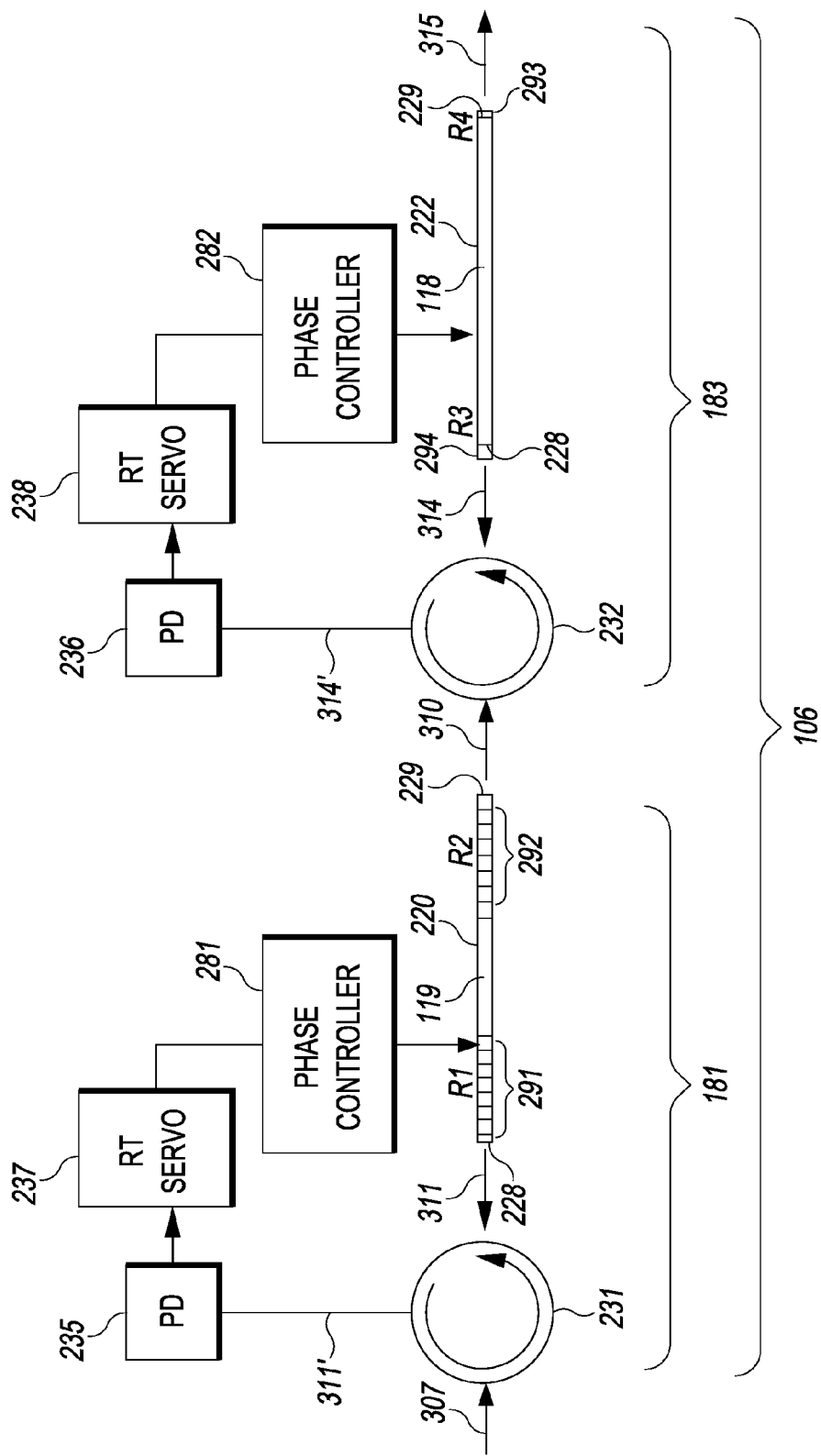

FIG. 5A is a block diagram of an embodiment of an optical-fiber filter system 106 in accordance with the present invention. The optical-fiber filter system 106 includes a first filter portion 181 and a second filter portion 183. The first filter portion 181 and the second filter portion 183 include a first optical-fiber filter 220 and a second optical-fiber filter 222, respectively, that have respective feedback loops to control the optical phase of the associated optical-fiber filters 220 and 222. The first filter portion 181 has the structure and function of the first filter portion 181 described above with reference to FIG. 4A.

The second filter portion 183 includes an optical-fiber filter 222, which is a narrow bandwidth reflector filter 222. In one implementation of this embodiment, the free spectral range (FSR) of the optical-fiber filter 222 is 5 MHz. The optical-fiber filter 222 is has a first broad band reflector 294 at the first end-face 228 of a hollow core optical fiber 118 and a second broad band reflector 293 at the second end-face 229 of the hollow core optical fiber 118. The hollow core optical fiber 118 does not generate SBS at power levels of interest in this application since the SBS threshold is so high. The hollow core optical fiber 118 is similar in structure to the hollow-core optical-fiber filters described in U.S. patent application Ser. No. 13/150,976 filed on Jun. 1, 2011, which is herein incorporated by reference in its entirety.

In one implementation of this embodiment, the optical-fiber filter system 106 also includes and an optical amplifier 201 at the output of the second optical-fiber filter 222. The first filter portion 181 and the second filter portion 183 function as described above with reference to FIG. 4A.

Figure 5B:
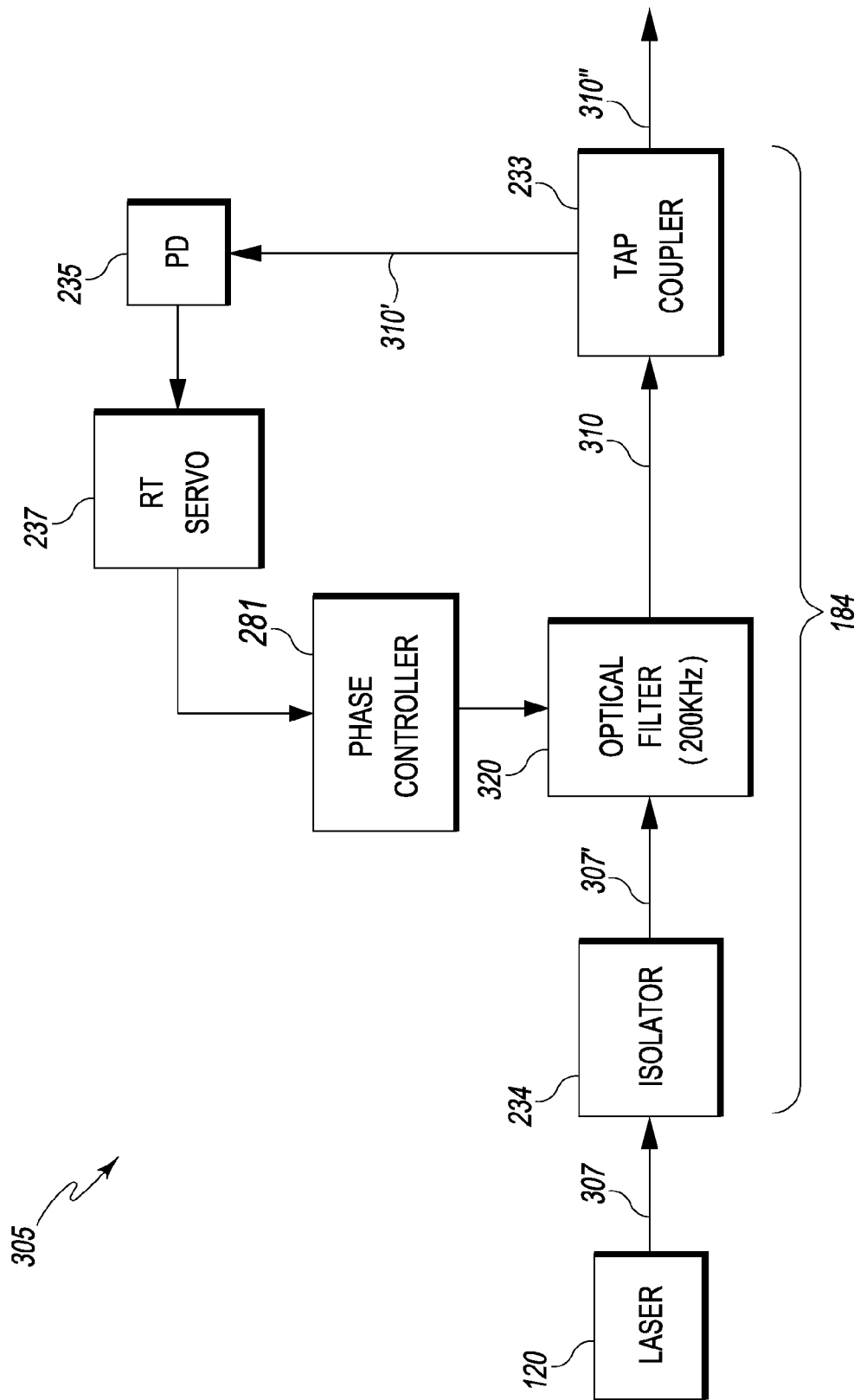

FIG. 5B is a block diagram of an embodiment of an optical-fiber filter system 305 in accordance with the present invention. The optical-fiber filter system 305 includes a filter portion 184. The filter portion 184 includes an optical isolator 234, an optical filter 320, a tap coupler 233, a photodiode (PD) 235, a resonance tracking servo 237, and a phase controller 281. In one implementation of this embodiment, the optical-fiber filter system 305 includes more than one filter portion 184. The "optical filter 320" is also referred to herein as an "optical-fiber filter 320".

As shown in FIG. 5B, an optical isolator 234 directs the polarized optical beam 307 from the laser 120 (as optical beam 307') to the input end-face of the optical filter 320 while preventing feedback to the laser 120 from the optical filter 320. The optical beam 310 output from the second end-face of the optical fiber that forms the optical filter 320 is input to a tap coupler 233.

The optical filter 320 is similar in structure and function to the optical-fiber filters 220, 221, or 222 described above with reference to FIGS. 1, 3, 4A-4D, and 5A. In one implementation of this embodiment, the optical filter 320 includes two or more of the optical-fiber filters 220, 221, and/or 222. In another implementation of this embodiment, two or more filter portions 184 are serially configured.

The photodiode 235 inputs a first portion 310' of the optical beam from the tap coupler 233. A second portion 310'' of the optical beam 310 is output from the optical-fiber filter system 184. In one implementation of this embodiment, the output from the optical-fiber filter system 184 is input to an optical amplifier, such as the optical amplifier 201 shown in FIGS. 1, 3, and 4A-4D. A resonance tracking servo 237 is communicatively coupled to input a signal from the photodiode 235 and to output a control signal to a phase controller 281. The phase controller 281 is configured to input the control signal from the resonance tracking servo 281 and to modify the phase of the optical beam 307' in the optical fiber of the optical filter 320 based on the control signal. The phase can be controlled by one of temperature, strain, or a combination thereof. In this manner, the photodiode 235, the resonance tracking servo 237, and phase controller 281 form a feedback loop to adjust the effective optical path length L of the optical-fiber filter 320 and the optical beam 310'' output from the optical-fiber filter system 184 has a narrow linewidth and reduced noise fluctuations.

Figure 6:
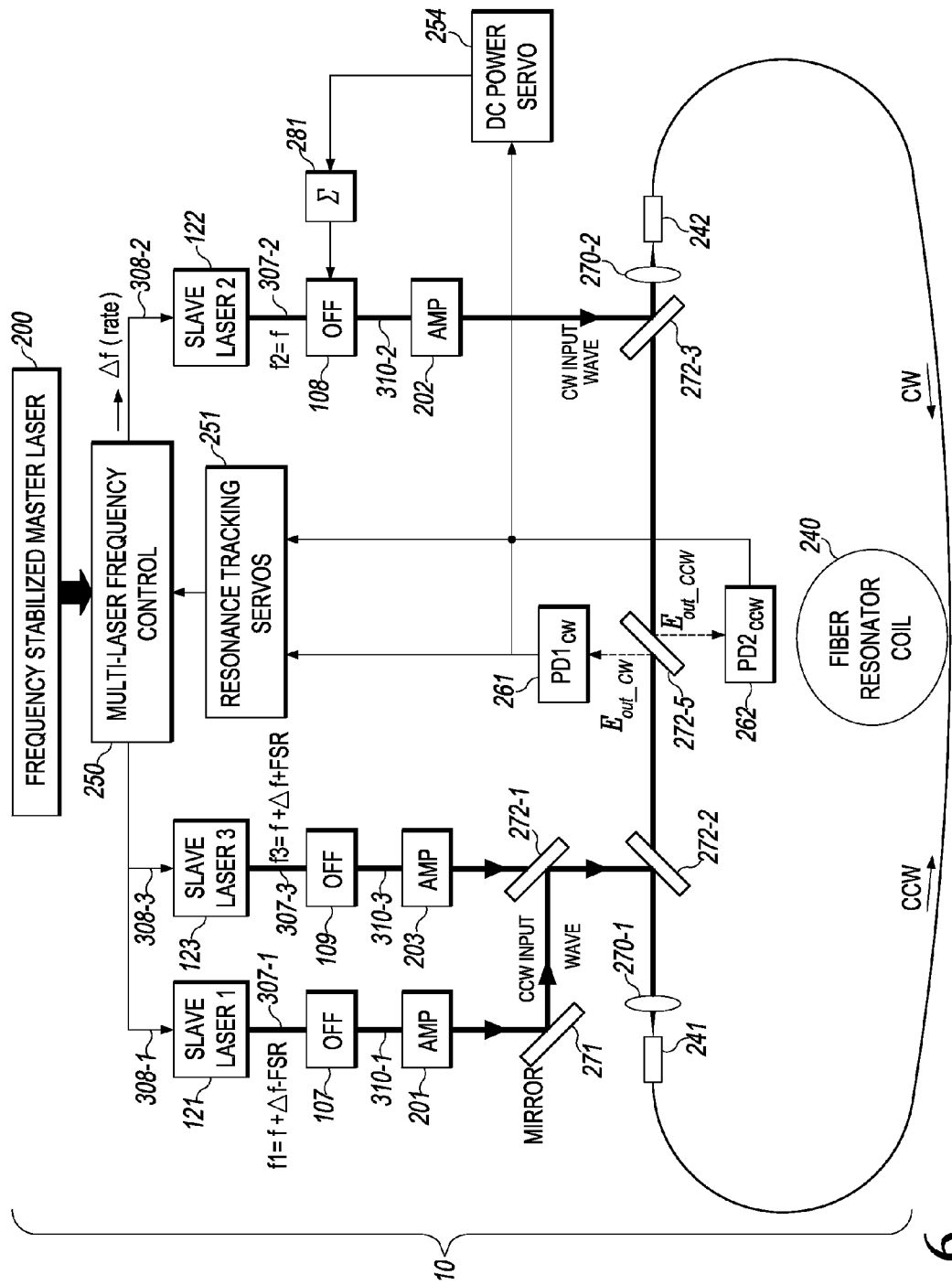
FIG. 6 is a block diagram of an embodiment of a resonator-fiber-optic gyroscope (RFOG) system that includes optical-fiber filters in accordance with the present invention.

FIG. 6 is a block diagram of an embodiment of a resonator-fiber-optic gyroscope (RFOG) system 10 that includes optical-fiber filters 107, 108, and 109 in accordance with the present invention. The optical-fiber filters (OFF) 107, 108, and 109 are any one of the optical-fiber filter systems 103, 104, 105, and 106 of FIGS. 1, 3, 4, and 5, respectively, without the amplifier 201. The amplifier 201 of optical-fiber filter systems 103, 104, 105, and 106 of FIGS. 1, 3, 4, and 5 respectively, are shown as amplifiers 201, 202, and 203 associated with optical-fiber filters 107, 108, and 109 in FIG. 6 in order to show how the RIN feedback system operates in the RFOG system 10. The optical-fiber filter 107 is referred to herein as a first optical-fiber filter 107. The optical-fiber filter 108 is referred to herein as a second optical-fiber filter 108. The optical-fiber filter 109 is referred to herein as a third optical-fiber filter 109.

The RFOG system 10 is also referred to herein as an RFOG 10. The RFOG system 10 is a high performance gyroscope system. The RFOG 10 includes a frequency stabilized master laser 200, three slave lasers 121, 122, and 123, three respective optical-fiber filters (OFF) 107, 108, and 109, three amplifiers 201, 202, and 203, and a fiber resonator coil 240. The three slave lasers 121, 122, and 123 are equivalent to the laser 120 in FIGS. 1 and 3 and provide polarized optical beams 307-1, 307-2, 307-3, respectively, to the optical-fiber filters 107, 108, and 109. The slave lasers 121, 122, and 123 emit light at frequencies, $f_1$, $f_2$, and $f_3$, which fall within the reflection band 550 shown in the reflection spectral response of FIG. 2. The BS generated by the polarized optical beams 307-1, 307-2, 307-3 fall within the rejection bands 555 and 556 shown in the reflection spectral response of FIG. 2.

The fiber resonator coil 240 is an optical fiber ring resonator that forms a fiber ring resonant cavity in the gyroscope. The fiber resonator coil 240 is also referred to herein as "fiber loop 240" and "sensing resonator 240". The fiber loop 240 is the optical fiber through which at least two optical beams counter-propagate. The output of the fiber loop 240 is used to determine the rate of rotation of the RFOG 10. In one implementation of this embodiment, there are only two optical-fiber filters 107 and 108 in the RFOG and two respective slave lasers 121 and 122. The optical-fiber filters 107, 108, and 109 can be the exemplary optical-fiber filters 100, 103, 101, or 102 shown in FIG. 1A, 1B, 2, or 3, respectively. In another implementation of this embodiment, the master laser 200 and the three slave lasers 121, 122, and 123 are semiconductor laser diodes. The frequency noise of each laser is reduced by the use of the optical-fiber filters 107, 108, and 109.

The frequency stabilized master laser 200 emits a reference optical beam 308. The reference optical beam 308 has low phase noise (e.g., less than 1 Hz/√Hz). The beam 308 is used to generate radio frequency (RF) beat signals between the master and slave lasers, which are used by phase locked loop (PLL) 250 (also referred to herein as "multi-laser frequency control 250") to lock the slave lasers 121, 122, and 123 to the master laser 200 with frequency separations determined by the resonance tracking servos 251. These beat signals are used by multi-laser frequency control 250, which receives feedback from resonance tracking servos 251, to precisely control the frequency of the optical beams of the slave lasers 121, 122, and 123.

As shown in FIG. 6, the slave laser 121 is locked to the reference optical beam 308-1 such that slave laser 121 emits light at a first frequency $f_1 = f + \Delta f - FSR$, where f is the central frequency of master laser 200, which is the frequency of the master laser or the frequency of the master laser plus a fixed offset frequency. $\Delta f$ is a frequency offset from the central frequency f due to rotation rate, and the FSR is the free spectral range of the sensing resonator 240. The free spectral range (FSR) is the frequency separation between adjacent resonance peaks of the sensing resonator 240. The slave laser 122 is locked to the reference optical beam 308-2 such that slave laser 122 emits light at a second frequency $f_2 = f$. The slave laser 123 is locked to the reference optical beam 308-3 such that slave laser 123 emits light at a third frequency $f_3 = f + \Delta f + FSR$.

The optical-fiber filters 107, 108, and 109 are arranged so that the respective output optical beams 307-1, 307-2, and 307-3 emitted from the slave lasers 121, 122, and 123 are coupled to the respective optical-fiber filters 107, 108, and 109. The optical-fiber filters 107, 108, and 109 output low-noise, coherent optical beams 310-1, 310-2, and 310-3, respectively. The low-noise, coherent optical beams 310-1, 310-2, and 310-3 are coupled into respective amplifiers 201, 202, and 203. As is known in the art, as the frequency noise of an optical beam is reduced, the coherence of the optical beam is increased.

The fiber resonator coil 240 (fiber loop 240) is an optical fiber that has a first coil end-face represented generally at 241 and a second coil end-face represented generally at 242. The low-noise, coherent optical beams 310-1 and 310-3 output from the optical-fiber filters 107 and 109 are coupled to the first coil end-face 241 of the fiber resonator coil 240 via the respective amplifiers 201 and 203. The low-noise, coherent optical beam 310-2 output from the optical-fiber filter 108 is coupled to the second coil end-face 242 of the fiber resonator coil 240 via the amplifier 202.

The optical beam 307-1 emitted from the first slave laser 121 is coupled to the input end-face 228 of the first optical-fiber filter 107. A first low-noise, coherent optical beam 310-1 is output from the output end-face 229 of the first optical-fiber filter 107 and is coupled (via the amplifier 201, optical elements including minor 271, beamsplitters 272(1-2) and lens 270-1) to the first coil end-face 241 of the fiber resonator coil 240. Other coupling configurations of optical elements are possible as is understandable to one skilled in the art. The portion of the optical beam 310-1 coupled into the fiber resonator coil 240 at the first coil end-face 241 propagates through the fiber resonator coil 240 in a counter-clockwise (CCW) direction.

The optical beam 307-2 emitted from the second slave laser 122 is coupled to the first end-face 228 of the second optical-fiber filter 108. A second low-noise, coherent optical beam 310-2 is output from the second end-face 114 of the second optical-fiber filter 108 and is coupled (via the amplifier 202 and optical elements including beam splitters 272-3 and lens 270-2) to the second coil end-face 242 of the fiber resonator coil 240. The portion of the optical beam 310-2 coupled into the fiber resonator coil 240 at the second coil end-face 242 propagates through the fiber resonator coil 240 in a clockwise (CW) direction.

The optical beam 307-3 emitted from the third slave laser 131 is coupled to the first end-face 228 of the third optical-fiber filter 109. A third low-noise, coherent optical beam 310-3 is output from the second end-face 114 of the third optical-fiber filter 109 and is coupled (via the amplifier 203 and optical elements including the beam splitters 272(1-2) and lens 270-1) to the first coil end-face 241 of the fiber resonator coil 240. The portion of the optical beam 310-3 coupled into the fiber resonator coil 240 at the first coil end-face 241 propagates through the fiber resonator coil 240 in a counter-clockwise (CCW) direction. In one implementation of this embodiment, the lenses 270(1-2) are ball lenses.

The light coupled into the fiber resonator coil 240 circulates multiple times within the fiber resonator coil 240 by transit through the lenses 270-1 and 270-2 and the beam splitters 272-2, 272-5, and 272-4. A portion (e.g., 1 to 20%) of the light propagating in the clockwise (CW) direction is reflected by beam splitter 272-5 into the detector (PD1$_{CW}$) 261. A portion (e.g., 1 to 20%) of the light propagating in the counter-clockwise (CCW) direction is reflected by beam splitter 272-5 into the detector (PD2$_{CCW}$) 262. Information indicative of the amount of optical power detected at the detectors 261 and 262 is sent as signals to the resonance tracking servos 251 and to the DC power servo 254. The resonance tracking servos 251 send signals to the multi-laser frequency control 250, which adjusts the frequency of the optical beams of the slave lasers 121, 122, and 123, as needed, to the resonance peaks of the sensing resonator 240. The DC power servo 254 sends signals to the summation circuit (Σ) 281 to adjust the power of the optical beam 310-2 output from the optical-fiber filter 108. This adjustment is done in order to balance the power in CW and CCW direction so that optical Kerr effect induced cavity length difference is minimized.

Embodiments of the RFOG 10 include components to reduce the intensity noise or unwanted intensity or amplitude modulation of the input optical beams 310(1-3). For example, in one implementation of this embodiment, the input optical beams 310(1-3) are passed through intensity modulators that are at the output of respective amplifiers 201-203. The intensity modulators and associated relative intensity noise (RIN) feedback systems are not shown for ease of viewing the RFOG 10 in FIG. 6. The above referenced U.S. patent application Ser. No. 13/150,976 filed on Jun. 1, 2011, which is herein incorporated by reference in its entirety, described the functionality of the intensity modulators and the RIN feedback system.

Figure 7:
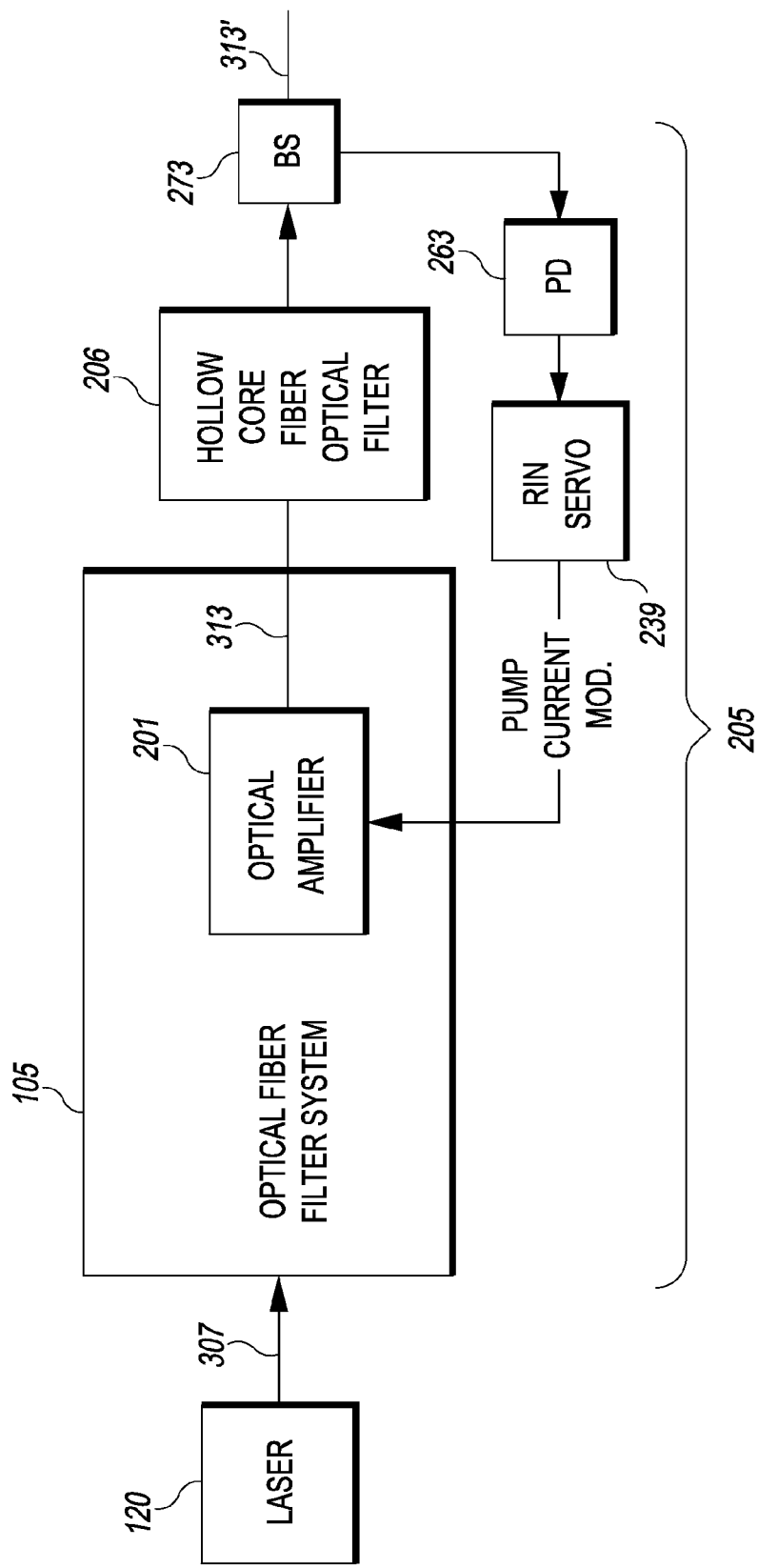
FIG. 7 is a block diagram of an embodiment of an optical-fiber filter system in accordance with the present invention.

FIG. 7 is a block diagram of an embodiment of an optical-fiber filter system 205 in accordance with the present invention. In this embodiment, an additional filtering is provided after the optical amplifier 201 to reduce amplified spontaneous emission (ASE) induced phase noise. As shown in FIG. 7, the optical-fiber filter system 205 includes the optical-fiber filter system 105, a hollow core fiber optical filter 206, a beamsplitter 273, a photodiode (PD) 263, and a relative intensity noise (RIN) servo 239. The optical beam 313 output from the optical-fiber filter system 105 is input into hollow core fiber optical filter 206. A portion of the output of the hollow core fiber optical filter 206 is directed by the beamsplitter 273 to the photodiode 263. The output of the photodiode 263 is output to the RIN servo 254, which generates a pump current modulation signal that is output to control the optical amplifier 201. In this manner the optical beam can be intensity modulated as required by the application. In one implementation of this embodiment, the hollow core fiber optical filter 206 has a linewidth of more than 1 MHz. As is understandable to one skilled in the art upon reading and understanding this document, the optical-fiber filter system 105 shown in FIG. 7 can be replaced by any of other embodiment of optical-fiber filter systems described herein (e.g., optical-fiber filter system 103, 104, or 106 of FIGS. 1, 3, and 5A, respectively).

Figure 8:
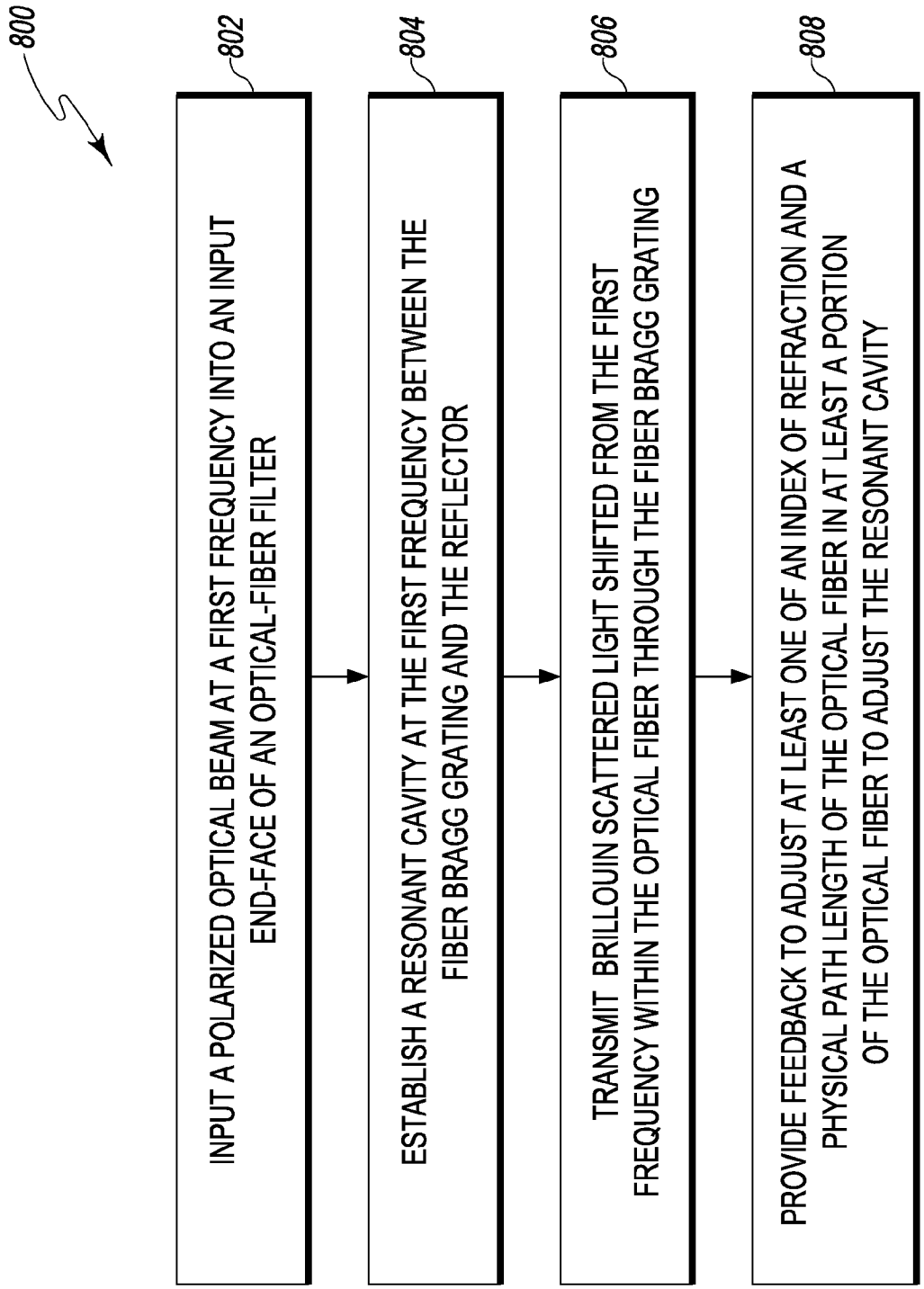
FIG. 8 is a flow diagram of an embodiment of a method to reduce stimulated Brillouin scattering in an optical-fiber filter system in accordance with the present invention.

FIG. 8 is a flow diagram of an embodiment of a method 800 to reduce stimulated Brillouin scattering in an optical-fiber filter in accordance with the present invention. The method is applicable to any one of the optical-fiber filters in the embodiments of the optical-fiber filter systems 103, 104, 105, 105', 105'', 105''', 106, 305, and 205 of FIGS. 1, 3, 4A-4D, 5A-5B, and 7, respectively.

At block 802, a polarized optical beam at a first frequency is input into an input end-face of an optical-fiber filter. The optical-fiber filter includes an optical fiber having the input end-face and an opposing second end-face, a fiber Bragg grating having a first reflectivity positioned at the input end-face, and a reflector having a second reflectivity positioned at the second end-face. The optical-fiber filter is one of the optical-fiber filters shown in the embodiments of the optical-fiber filter systems 103, 104, 105, 105', 105'', 105''', 106, and 205 of FIGS. 1, 3, 4A-4D, 5 and 7, respectively.

At block 804, a resonant cavity is established at the first frequency between the fiber Bragg grating and the reflector based on inputting the polarized optical into the input end-face of the optical-fiber filter. The input end-face and second end-face set a fiber length, which is approximately equal to the length of the resonant cavity. If the optical-fiber filter system includes two or more optical-fiber filters, then a resonant cavity is established in each of the optical-fiber filters.

At block 806, Brillouin scattered (BS) light that is shifted from the first frequency within the optical fiber is transmitted through the fiber Bragg grating based on inputting the polarized optical into the input end-face of the optical-fiber filter. In this manner, the BS is not propagating multiple times within the optical fiber and the noise on the optical beam output from the optical-fiber filter is reduced. If the optical-fiber filter system includes two optical-fiber filters, then the BS light that is shifted from the first frequency within each of the optical fibers is transmitted through one or both of the fiber Bragg gratings in one or both of the optical fibers.

At block 808, feedback is provided to adjust an index of refraction, a physical path length, or both of the optical fiber in at least a portion of the optical fiber in order to adjust the resonant cavity. By changing at least one of: 1) the index of refraction of at least a portion of the optical fiber; and 2) the physical path length of at least a portion of the optical fiber, the effective length of the resonant cavity changes. If the optical-fiber filter system includes two optical-fiber filters, then feedback is provided to one or both of the optical fibers.

In one implementation of this embodiment, the fiber Bragg gratings are about 5-20 centimeters in extent. In another implementation of this embodiment, the fiber Bragg gratings can handle optical powers up to 10 Watts CW. In another implementation of this embodiment, the fiber Bragg gratings are heat sinked and can handle optical powers up to 100 Watts CW. In yet another implementation of this embodiment, the optical fibers used in the optical-fiber filters are large core fibers (approximately 10-12 micrometers in diameter). In yet another implementation of this embodiment, the optical fibers used in the optical-fiber filters are silica fibers.

Example Embodiments

Example 1 includes an optical-fiber filter system to narrow a linewidth and to reduce noise fluctuations of an optical beam, the optical-fiber filter system comprising an optical fiber having a first end-face and an opposing second end-face, the first end-face and the second end-face setting a fiber length; a fiber Bragg grating having a first reflectivity positioned at the first end-face; and a reflector having a second reflectivity positioned at the second end-face, wherein, when the optical beam at a first frequency is coupled from a laser into one of the first end-face or the second end-face, a resonant cavity is established at the first frequency between the fiber Bragg grating and the reflector while Brillouin scattered light shifted from the first frequency within the optical fiber is transmitted through the fiber Bragg grating.

In Example 2, the optical-fiber filter system of Example 1 can optionally include, wherein the optical beam from the laser is configured to couple into the first end-face, the first end-face being an input end-face, the optical-fiber filter system further comprising: a photodiode; a circulator to direct the optical beam from the laser to the input end-face, and to direct an optical beam from the input end-face of the optical fiber to the photodiode; a resonance tracking servo communicatively coupled to input a signal from the photodiode and to output a control signal to a phase controller; and the phase controller configured to input the control signal from the resonance tracking servo and to modify the phase of the optical beam in the optical fiber based on the control signal.

In Example 3, the optical-fiber filter system of Example 1 can optionally include, wherein the optical beam from the laser is configured to couple into the first end-face, the first end-face being an input end-face, the further comprising: an optical isolator to direct the optical beam from the laser to the input end-face; a tap coupler to input the optical beam output from the second end-face of the optical fiber; a photodiode to input a first portion of the optical beam from the tap coupler, wherein a second portion of the optical beam is output from the optical-fiber filter system; a resonance tracking servo communicatively coupled to input a signal from the photodiode and to output a control signal to a phase controller; and the phase controller configured to input the control signal from the resonance tracking servo and to modify the phase of the optical beam in the optical fiber based on the control signal.

In Example 4, the optical-fiber filter system of any of Examples 1-3 can optionally include, wherein the fiber Bragg grating is a first fiber Bragg grating and the reflector is a second fiber Bragg grating, wherein when the optical beam is coupled from the laser into one of the first end-face or the second end-face, the resonant cavity at the first frequency is established between the first fiber Bragg grating and the second fiber Bragg grating, while the Brillouin scattered light shifted from the first frequency within the optical fiber is transmitted through the first fiber Bragg grating and the second fiber Bragg grating.

In Example 5, the optical-fiber filter system of any of Examples 1-4 can optionally include, wherein the optical beam from the laser is configured to couple into the first end-face, the first end-face being an input end-face, the optical-fiber filter system further comprising: a photodiode; a circulator to direct the optical beam from the laser to the input end-face, and to direct an optical beam from the input end-face of the optical fiber to the photodiode; a resonance tracking servo communicatively coupled to input a signal from the photodiode and to output a control signal to a phase controller; and the phase controller configured to input the control signal from the resonance tracking servo and configured to adjust a strain on the optical fiber based on the control signal.

In Example 6, the optical-fiber filter system of any of Examples 1-5 can optionally include, wherein the optical fiber is a first optical fiber having a first fiber length, and the resonance cavity is a first resonance cavity, the optical-fiber filter system further comprising: a second optical fiber having a first end-face and an opposing second end-face, the first end-face and the second end-face of the second optical fiber setting a second fiber length; a third fiber Bragg grating having a third reflectivity and positioned at the first end-face of the second optical fiber; and a second reflector having a fourth reflectivity and positioned at the second end-face of the second optical fiber, wherein, when an optical beam from the first optical fiber is coupled into one of the first end-face or the second end-face of the second optical fiber, a second resonant cavity is established at the first frequency between the third fiber Bragg grating and the second reflector, and Brillouin scattered light shifted from the first frequency within the second optical fiber is transmitted through the third fiber Bragg grating.

In Example 7, the optical-fiber filter system of any of Examples 1-6 can optionally include, wherein the optical beam from the laser is configured to couple into the first end-face of the first optical fiber, the first end-face being a first input end-face, wherein the optical beam from the first optical fiber is configured to couple into the first end-face of the second optical fiber, the first end-face of the second optical fiber being a second input end-face, the optical-fiber filter system further comprising: a first photodiode; a first circulator to direct the optical beam from the laser to the first input end-face, and to direct an optical beam from the first input end-face to the first photodiode; a first resonance tracking servo communicatively coupled to input a signal from the first photodiode and to output a control signal to a first phase controller; and the first phase controller configured to input the control signal from the first resonance tracking servo and configured to adjust a pressure on the first optical fiber based on the control signal; a second photodiode; a second circulator to direct the optical beam from an output end-face of the first optical fiber to the second input end-face, and to direct an optical beam from the second input end-face to the second photodiode; a second resonance tracking servo communicatively coupled to input a signal from the second photodiode and to output a control signal to a second phase controller; and the second phase controller configured to input the control signal from the second resonance tracking servo and configured to adjust a strain on the second optical fiber based on the control signal.

In Example 8, the optical-fiber filter system of any of Examples 1-6, can optionally include, wherein the second reflector is a fourth fiber Bragg grating positioned at the second end-face of the second optical fiber, wherein when an optical beam from the first optical fiber is coupled into one of the first end-face or the second end-face of the second optical fiber, the second resonant cavity is established at the first frequency between the third fiber Bragg grating and the fourth fiber Bragg grating while Brillouin scattered light shifted from the first frequency in the second optical fiber is also transmitted through the fourth Bragg grating.

In Example 9, the optical-fiber filter system of any of Examples 1-6 and 8, can optionally include, wherein the optical beam from the laser is configured to couple into the first end-face of the first optical fiber, the first end-face being a first input end-face, wherein the optical beam from the first optical fiber is configured to couple into the first end-face of the second optical fiber, the first end-face of the second optical fiber being a second input end-face, the optical-fiber filter system further comprising: a first photodiode; a first circulator to direct the optical beam from the laser to the first input end-face, and to direct an optical beam from the first input end-face to the first photodiode; a first resonance tracking servo communicatively coupled to input a signal from the first photodiode and to output a control signal to a first phase controller; and the first phase controller configured to input the control signal from the first resonance tracking servo and configured to adjust a strain on the first optical fiber based on the control signal; a second photodiode; a second circulator to direct the optical beam from an output end-face of the first optical fiber to the second input end-face, and to direct an optical beam from the second input end-face to the second photodiode; a second resonance tracking servo communicatively coupled to input a signal from the second photodiode and to output a control signal to a second phase controller; and the second phase controller configured to input the control signal from the second resonance tracking servo and configured to adjust a strain on the second optical fiber based on the control signal.

Example 10 includes method of reducing stimulated Brillouin scattering in an optical-fiber filter system, the method comprising: inputting a polarized optical beam at a first frequency into an input end-face of an optical-fiber filter, the optical-fiber filter comprising: an optical fiber having the input end-face and an opposing second end-face, the input end-face and the second end-face setting a fiber length; a fiber Bragg grating having a first reflectivity positioned at the input end-face; and a reflector having a second reflectivity positioned at the second end-face; the method further including establishing a resonant cavity at the first frequency between the fiber Bragg grating and the reflector based on the inputting; and transmitting Brillouin scattered light shifted from the first frequency within the optical fiber through the fiber Bragg grating based on the inputting.

In Example 11, the method of Example 10, can optionally further comprise: providing feedback to adjust at least one of an index of refraction and a physical path length of the optical fiber in at least a portion of the optical fiber, to adjust the resonant cavity.

In Example 12, the method of any of Examples 10-11, can optionally include, wherein the optical fiber is a first optical fiber having a first fiber length, the fiber Bragg grating is a first fiber Bragg grating, the reflector is a first reflector, and the resonant cavity is a first resonant cavity, wherein the optical-fiber filter is a first optical-fiber filter, the optical-fiber filter system further comprising a second optical-fiber filter comprising: a second optical fiber having a second input end-face and an opposing end-face, the second input end-face and the opposing end-face setting a second fiber length; a second fiber Bragg grating having a third reflectivity positioned at the second input end-face; and a second reflector having a fourth reflectivity positioned at the opposing end-face of the second fiber, the method further comprising: coupling light at the first frequency emitted from the second end-face of the first optical fiber into the second input end-face of the second optical fiber; establishing a second resonant cavity at the first frequency between the second fiber Bragg grating and the second reflector based on the coupling; and transmitting Brillouin scattered light shifted from the first frequency within the second optical fiber through the second fiber Bragg grating based on the coupling.

In Example 13, the method of any of Examples 10-12, can optionally further comprise: providing feedback to adjust at least one of an index of refraction and a physical path length of the first optical fiber in at least a portion of the first optical fiber, to adjust the first resonant cavity; and providing feedback to adjust at least one of an index of refraction and a physical path length of the second optical fiber, to adjust the second resonant cavity.

In Example 14, the method of any of claims 10-13, can optionally include, wherein the optical fiber is a first optical fiber having a first fiber length, the fiber Bragg grating is a first fiber Bragg grating, the reflector is a second fiber Bragg grating, and the resonant cavity is a first resonant cavity, wherein the optical-fiber filter is a first optical-fiber filter, the optical-fiber filter system further comprising a second optical-fiber filter comprising: a second optical fiber having a second input end-face and an opposing end-face, the second input end-face and the opposing end-face setting a second fiber length; a third fiber Bragg grating having a third reflectivity positioned at the second input end-face; and a second reflector having a fourth reflectivity positioned at the opposing end-face of the second fiber, the method further comprising: coupling light at the first frequency emitted from the second end-face of the first optical fiber into the input end-face of the second optical fiber; establishing a second resonant cavity at the first frequency between the third fiber Bragg grating and the second reflector based on the coupling; and transmitting Brillouin scattered light shifted from the first frequency within the second optical fiber through the third fiber Bragg grating based on the coupling.

In Example 15, the method of any of claims 10-14, can optionally further comprise: providing feedback to adjust at least one of an index of refraction and a physical path length of the first optical fiber in at least a portion of the first optical fiber, to adjust the first resonant cavity established between the first fiber Bragg grating and the second fiber Bragg grating; and providing feedback to adjust at least one of an index of refraction and a physical path length of the second optical fiber in at least a portion of the second optical fiber, to adjust the second resonant cavity established between the third fiber Bragg grating and the second reflector.

Example 16 includes a resonator-fiber-optic gyroscope comprising: a frequency stabilized master laser emitting a reference optical beam; at least two slave lasers arranged so that the reference optical beam controls the respective at least two slave lasers; at least two optical-fiber filter systems arranged so that optical beams emitted from the at least two slave lasers are coupled to the respective at least two optical-fiber filter systems, wherein low-noise, narrow linewidth optical beams are output from the respective optical-fiber filter systems; and a fiber resonator coil having a first coil end-face and a second coil end-face, wherein an optical beam output from one of the at least two optical-fiber filter systems is coupled to the first coil end-face of the fiber resonator coil, and wherein an optical beam output from another one of the at least two optical-fiber filter systems is coupled to the second coil end-face of the fiber resonator coil.

In Example 17, the resonator-fiber-optic gyroscope of Example 16 can optionally include, wherein the at least two optical-fiber filter systems comprise: an optical fiber having an input end-face and an opposing second end-face, the input end-face and the second end-face setting a fiber length; a fiber Bragg grating having a first reflectivity positioned at the input end-face; and a reflector having a second reflectivity positioned at the second end-face, wherein, when optical beams emitted from the at least two slave lasers at a respective at least two frequencies are coupled into the input end-face of the optical fibers of the at least two optical-fiber filter systems, a respective resonant cavity is established at the respective at least two frequencies between the fiber Bragg grating and the reflector while Brillouin scattered light shifted from the respective at least two frequencies within the respective at least two optical fibers of the at least two optical-fiber filter systems is transmitted through the fiber Bragg grating of the respective least two optical-fiber filter systems.

In Example 18, the resonator-fiber-optic gyroscope of any of Examples 16-17 can optionally include, wherein the optical beams emitted from the at least two slave lasers are configured to couple into the at least two input end-faces, wherein the at least two optical-fiber filter systems further comprise: a photodiode; a circulator to direct the optical beam emitted from one of the at least two slave lasers to the input end-face, and to direct an optical beam from the input end-face of the optical fiber to the photodiode; a resonance tracking servo communicatively coupled to input a signal from the photodiode and to output a control signal to a phase controller; and the phase controller configured to input the control signal from the resonance tracking servo and configured to adjust a strain on the optical fiber based on the control signal.

In Example 19, the resonator-fiber-optic gyroscope of any of Examples 16-18 can optionally include, wherein the optical beam emitted from a third slave laser is coupled to an input end-face of a third optical-fiber filter system, wherein a third low-noise, coherent optical beam output from a second end-face of the third optical-fiber filter system is coupled to the first coil end-face of the fiber resonator coil.

In Example 20, the resonator-fiber-optic gyroscope of any of Examples 16-19 can optionally include, wherein the optical fibers of the at least two optical-fiber filter systems are first optical fibers having a first fiber length, wherein the fiber Bragg gratings are first fiber Bragg gratings, the reflectors are first reflectors, and the resonance cavities are first resonance cavities, the at least two optical-fiber filter systems further comprising: a second optical fiber having an input end-face and an opposing second end-face, the input end-face and the second end-face of the second optical fiber setting a second fiber length; a second fiber Bragg grating having a third reflectivity and positioned at the input end-face of the second optical fiber; and a second reflector having a fourth reflectivity and positioned at the second end-face of the second optical fiber, wherein, when optical beams emitted from the at least two second end-faces of the at least two first optical fibers at a respective at least two frequencies are coupled into the input end-face of the at least two second optical fibers of the at least two optical-fiber filter systems, a respective at least two second resonant cavities are established at the respective at least two frequencies between the second fiber Bragg grating and the second reflector while Brillouin scattered light shifted from the respective at least two frequencies within the respective at least two second optical fibers of the at least two optical-fiber filter systems is transmitted through the second fiber Bragg grating of the respective least two optical-fiber filter systems.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An optical-fiber filter system to narrow a linewidth and to reduce noise fluctuations of an optical beam, the optical-fiber filter system comprising:
   an optical fiber having a first end-face and an opposing second end-face, the first end-face and the second end-face setting a fiber length;
   a fiber Bragg grating having a first reflectivity positioned at the first end-face; and
   a reflector having a second reflectivity positioned at the second end-face, wherein, when the optical beam at a first frequency is coupled from a laser into one of the first end-face or the second end-face, a resonant cavity is established at the first frequency between the fiber Bragg grating and the reflector while Brillouin scattered light shifted from the first frequency within the optical fiber is transmitted through the fiber Bragg grating.

2. The optical-fiber filter system of claim 1, wherein the optical beam from the laser is configured to couple into the first end-face, the first end-face being an input end-face, the optical-fiber filter system further comprising:
   a photodiode;
   a circulator to direct the optical beam from the laser to the input end-face, and to direct an optical beam from the input end-face of the optical fiber to the photodiode;
   a resonance tracking servo communicatively coupled to input a signal from the photodiode and to output a control signal to a phase controller; and
   the phase controller configured to input the control signal from the resonance tracking servo and to modify the phase of the optical beam in the optical fiber based on the control signal.

3. The optical-fiber filter system of claim 1, wherein the optical beam from the laser is configured to couple into the first end-face, the first end-face being an input end-face, the optical-fiber filter system further comprising:
   an optical isolator to direct the optical beam from the laser to the input end-face;

a tap coupler to input the optical beam output from the second end-face of the optical fiber;

a photodiode to input a first portion of the optical beam from the tap coupler, wherein a second portion of the optical beam is output from the optical-fiber filter system;

a resonance tracking servo communicatively coupled to input a signal from the photodiode and to output a control signal to a phase controller; and the phase controller configured to input the control signal from the resonance tracking servo and to modify the phase of the optical beam in the optical fiber based on the control signal.

4. The optical-fiber filter system of claim 1, wherein the optical fiber is a first optical fiber having a first fiber length, wherein the fiber Bragg grating is a first fiber Bragg grating, the reflector is a first reflector, and the resonance cavity is a first resonance cavity, the optical-fiber filter system further comprising:

a second optical fiber having a first end-face and an opposing second end-face, the first end-face and the second end-face of the second optical fiber setting a second fiber length;

a second fiber Bragg grating having a third reflectivity and positioned at the first end-face of the second optical fiber; and a second reflector having a fourth reflectivity and positioned at the second end-face of the second optical fiber, wherein, when an optical beam at the first frequency is coupled from the first optical fiber into one of the first end-face or the second end-face of the second optical fiber, a second resonant cavity at the first frequency is established between the second fiber Bragg grating and the second reflector, while Brillouin scattered light shifted from the first frequency within the second optical fiber is transmitted through the second fiber Bragg grating.

5. The optical-fiber filter system of claim 1, wherein the fiber Bragg grating is a first fiber Bragg grating and the reflector is a second fiber Bragg grating, wherein when the optical beam is coupled from the laser into one of the first end-face or the second end-face, the resonant cavity at the first frequency is established between the first fiber Bragg grating and the second fiber Bragg grating, while the Brillouin scattered light shifted from the first frequency within the optical fiber is transmitted through the first fiber Bragg grating and the second fiber Bragg grating.

6. The optical-fiber filter system of claim 5, wherein the optical fiber is a first optical fiber having a first fiber length, and the resonance cavity is a first resonance cavity, the optical-fiber filter system further comprising:

a second optical fiber having a first end-face and an opposing second end-face, the first end-face and the second end-face of the second optical fiber setting a second fiber length;

a third fiber Bragg grating having a third reflectivity and positioned at the first end-face of the second optical fiber; and a second reflector having a fourth reflectivity and positioned at the second end-face of the second optical fiber, wherein, when an optical beam from the first optical fiber is coupled into one of the first end-face or the second end-face of the second optical fiber, a second resonant cavity is established at the first frequency between the third fiber Bragg grating and the second reflector, and Brillouin scattered light shifted from the first frequency within the second optical fiber is transmitted through the third fiber Bragg grating.

7. The optical-fiber filter system of claim 6, wherein the optical beam from the laser is configured to couple into the first end-face of the first optical fiber, the first end-face being a first input end-face, wherein the optical beam from the first optical fiber is configured to couple into the first end-face of the second optical fiber, the first end-face of the second optical fiber being a second input end-face, the optical-fiber filter system further comprising:

a first photodiode;

a first circulator to direct the optical beam from the laser to the first input end-face, and to direct an optical beam from the first input end-face to the first photodiode;

a first resonance tracking servo communicatively coupled to input a signal from the first photodiode and to output a control signal to a first phase controller; and the first phase controller configured to input the control signal from the first resonance tracking servo and configured to adjust a strain on the first optical fiber based on the control signal;

a second photodiode;

a second circulator to direct the optical beam from an output end-face of the first optical fiber to the second input end-face, and to direct an optical beam from the second input end-face to the second photodiode;

a second resonance tracking servo communicatively coupled to input a signal from the second photodiode and to output a control signal to a second phase controller; and the second phase controller configured to input the control signal from the second resonance tracking servo and configured to adjust a strain on the second optical fiber based on the control signal.

8. The optical-fiber filter system of claim 6, wherein the second reflector is a fourth fiber Bragg grating positioned at the second end-face of the second optical fiber, wherein when an optical beam from the first optical fiber is coupled into one of the first end-face or the second end-face of the second optical fiber, the second resonant cavity is established at the first frequency between the third fiber Bragg grating and the fourth fiber Bragg grating while the Brillouin scattered light shifted from the first frequency in the second optical fiber is also transmitted through the fourth Bragg grating.

9. The optical-fiber filter system of claim 8, wherein the optical beam from the laser is configured to couple into the first end-face of the first optical fiber, the first end-face being a first input end-face, wherein the optical beam from the first optical fiber is configured to couple into the first end-face of the second optical fiber, the first end-face of the second optical fiber being a second input end-face, the optical-fiber filter system further comprising:

a first photodiode;

a first circulator to direct the optical beam from the laser to the first input end-face, and to direct an optical beam from the first input end-face to the first photodiode;

a first resonance tracking servo communicatively coupled to input a signal from the first photodiode and to output a control signal to a first phase controller; and the first phase controller configured to input the control signal from the first resonance tracking servo and configured to adjust a strain on the first optical fiber based on the control signal;

a second photodiode;

a second circulator to direct the optical beam from an output end-face of the first optical fiber to the second input end-face, and to direct an optical beam from the second input end-face to the second photodiode;
a second resonance tracking servo communicatively coupled to input a signal from the second photodiode and to output a control signal to a second phase controller; and
the second phase controller configured to input the control signal from the second resonance tracking servo and configured to adjust a strain on the second optical fiber based on the control signal.

10. A method of reducing stimulated Brillouin scattering in an optical-fiber filter system, the method comprising:
inputting a polarized optical beam at a first frequency into an input end-face of an optical-fiber filter, the optical-fiber filter comprising:
an optical fiber having the input end-face and an opposing second end-face, the input end-face and the second end-face setting a fiber length;
a fiber Bragg grating having a first reflectivity positioned at the input end-face; and
a reflector having a second reflectivity positioned at the second end-face;
establishing a resonant cavity at the first frequency between the fiber Bragg grating and the reflector based on the inputting; and
transmitting Brillouin scattered light shifted from the first frequency within the optical fiber through the fiber Bragg grating based on the inputting.

11. The method of claim 10, further comprising:
providing feedback to adjust at least one of an index of refraction and a physical path length of the optical fiber in at least a portion of the optical fiber, to adjust the resonant cavity.

12. The method of claim 10, wherein the optical fiber is a first optical fiber having a first fiber length, the fiber Bragg grating is a first fiber Bragg grating, the reflector is a first reflector, and the resonant cavity is a first resonant cavity,
wherein the optical-fiber filter is a first optical-fiber filter, the optical-fiber filter system further comprising a second optical-fiber filter comprising:
a second optical fiber having a second input end-face and an opposing end-face, the second input end-face and the opposing end-face setting a second fiber length;
a second fiber Bragg grating having a third reflectivity positioned at the second input end-face; and
a second reflector having a fourth reflectivity positioned at the opposing end-face of the second fiber, the method further comprising:
coupling light at the first frequency emitted from the second end-face of the first optical fiber into the second input end-face of the second optical fiber;
establishing a second resonant cavity at the first frequency between the second fiber Bragg grating and the second reflector based on the coupling; and
transmitting Brillouin scattered light shifted from the first frequency within the second optical fiber through the second fiber Bragg grating based on the coupling.

13. The method of claim 12, further comprising:
providing feedback to adjust at least one of an index of refraction and a physical path length of the first optical fiber in at least a portion of the first optical fiber, to adjust the first resonant cavity; and
providing feedback to adjust at least one of an index of refraction and a physical path length of the second optical fiber, to adjust the second resonant cavity.

14. The method of claim 10, wherein the optical fiber is a first optical fiber having a first fiber length, the fiber Bragg grating is a first fiber Bragg grating, the reflector is a second fiber Bragg grating, and the resonant cavity is a first resonant cavity,
wherein the optical-fiber filter is a first optical-fiber filter, the optical-fiber filter system further comprising a second optical-fiber filter comprising:
a second optical fiber having a second input end-face and an opposing end-face, the second input end-face and the opposing end-face setting a second fiber length;
a third fiber Bragg grating having a third reflectivity positioned at the second input end-face; and
a second reflector having a fourth reflectivity positioned at the opposing end-face of the second fiber, the method further comprising:
coupling light at the first frequency emitted from the second end-face of the first optical fiber into the input end-face of the second optical fiber;
establishing a second resonant cavity at the first frequency between the third fiber Bragg grating and the second reflector based on the coupling; and
transmitting Brillouin scattered light shifted from the first frequency within the second optical fiber through the third fiber Bragg grating based on the coupling.

15. The method of claim 14, further comprising:
providing feedback to adjust at least one of an index of refraction and a physical path length of the first optical fiber in at least a portion of the first optical fiber, to adjust the first resonant cavity established between the first fiber Bragg grating and the second fiber Bragg grating; and
providing feedback to adjust at least one of an index of refraction and a physical path length of the second optical fiber in at least a portion of the second optical fiber, to adjust the second resonant cavity established between the third fiber Bragg grating and the second reflector.

16. A resonator-fiber-optic gyroscope comprising:
a frequency stabilized master laser emitting a reference optical beam;
at least two slave lasers arranged so that the reference optical beam controls the respective at least two slave lasers;
at least two optical-fiber filter systems arranged so that optical beams emitted from the at least two slave lasers are coupled to the respective at least two optical-fiber filter systems, wherein the at least two optical-fiber filter systems comprise:
an optical fiber having an input end-face and an opposing second end-face, the input end-face and the second end-face setting a fiber length;
a fiber Bragg grating having a first reflectivity positioned at the input end-face; and
a reflector having a second reflectivity positioned at the second end-face, wherein, when optical beams emitted from the at least two slave lasers at a respective at least two frequencies are coupled into the input end-face of the optical fibers of the at least two optical-fiber filter systems, a respective resonant cavity is established at the respective at least two frequencies between the fiber Bragg grating and the reflector while stimulated Brillouin scattered light and spontaneous Brillouin scattered light shifted from the respective at least two frequencies within the respective at least two optical fibers of the at least two optical-fiber filter systems is transmitted through the fiber Bragg grating of the respective at least two optical-fiber filter systems, wherein low-noise, narrow linewidth optical beams are output from the respective optical-fiber filter systems; and a fiber resonator coil having a first coil end-face and a second coil end-face,
wherein an optical beam output from one of the at least two optical-fiber filter systems is coupled to the first coil end-face of the fiber resonator coil, and
wherein an optical beam output from another one of the at least two optical-fiber filter systems is coupled to the second coil end-face of the fiber resonator coil.

17. The resonator-fiber-optic gyroscope of claim 16, wherein the optical beams emitted from the at least two slave lasers are configured to couple into the at least two input end-faces, wherein each of the at least two optical-fiber filter systems further comprises:
a photodiode;
a circulator to direct the optical beam emitted from one of the at least two slave lasers to the input end-face, and to direct an optical beam from the input end-face of the optical fiber to the photodiode;
a resonance tracking servo communicatively coupled to input a signal from the photodiode and to output a control signal to a phase controller; and
the phase controller configured to input the control signal from the resonance tracking servo and configured to adjust a strain on the optical fiber based on the control signal.

18. The resonator-fiber-optic gyroscope of claim 17, wherein the optical beam emitted from a third slave laser is coupled to an input end-face of a third optical-fiber filter system, wherein a third low-noise, coherent optical beam output from a second end-face of the third optical-fiber filter system is coupled to the first coil end-face of the fiber resonator coil.

19. The resonator-fiber-optic gyroscope of claim 16, wherein the optical fibers of the at least two optical-fiber filter systems are first optical fibers having a first fiber length, wherein the fiber Bragg gratings are first fiber Bragg gratings, the reflectors are first reflectors, and the resonance cavities are first resonance cavities, and the at least two optical-fiber filter systems further comprising:
a second optical fiber having an input end-face and an opposing second end-face, the input end-face and the second end-face of the second optical fiber setting a second fiber length;
a second fiber Bragg grating having a third reflectivity and positioned at the input end-face of the second optical fiber; and
a second reflector having a fourth reflectivity and positioned at the second end-face of the second optical fiber, wherein, when optical beams emitted from the at least two second end-faces of the at least two first optical fibers at a respective at least two frequencies are coupled into the input end-face of the at least two second optical fibers of the at least two optical-fiber filter systems, a respective at least two second resonant cavities are established at the respective at least two frequencies between the second fiber Bragg grating and the second reflector while stimulated Brillouin scattered light and spontaneous Brillouin scattered light shifted from the respective at least two frequencies within the respective at least two second optical fibers of the at least two optical-fiber filter systems is transmitted through the second fiber Bragg grating of the respective at least two optical-fiber filter systems.

* * * * *